United States Patent [19]

Zimmerman et al.

[11] Patent Number: 5,481,385

[45] Date of Patent: Jan. 2, 1996

[54] DIRECT VIEW DISPLAY DEVICE WITH ARRAY OF TAPERED WAVEGUIDE ON VIEWER SIDE

[75] Inventors: Scott M. Zimmerman, Olathe, Kans.; Karl W. Beeson, Princeton, N.J.; Michael J. McFarland, Washington, N.J.; James T. Yardley, Morristown, N.J.; Paul M. Ferm, Morristown, N.J.

[73] Assignee: AlliedSignal Inc., Morris Township, N.J.

[21] Appl. No.: 86,414

[22] Filed: Jul. 1, 1993

[51] Int. Cl.$^6$ ............................................. G02F 1/1335
[52] U.S. Cl. ................................. 359/40; 359/41; 359/42
[58] Field of Search .................................. 359/40, 41, 42

[56] References Cited

U.S. PATENT DOCUMENTS

| Re. 33,987 | 7/1992 | Suzawa | 359/49 |
|---|---|---|---|
| 1,942,841 | 1/1934 | Shimizu | 88/24 |
| 3,180,214 | 4/1965 | Fox | 88/28.9 |
| 3,218,924 | 11/1965 | Miller | 88/28.93 |
| 3,279,314 | 10/1966 | Miller | 88/28.93 |
| 3,704,055 | 11/1972 | Hong | 359/455 |

(List continued on next page.)

FOREIGN PATENT DOCUMENTS

| 0179913 | 5/1986 | European Pat. Off. . | |
|---|---|---|---|
| 0357396 | 3/1990 | European Pat. Off. . | |
| 0525755 | 2/1993 | European Pat. Off. . | |
| 3402746 | 8/1985 | Germany . | |
| 55-110217 | 8/1980 | Japan | 359/42 |
| 57-207235 | 12/1982 | Japan . | |
| 58-114026 | 7/1983 | Japan . | |
| 59-210418 | 11/1984 | Japan . | |
| 59-210477 | 11/1984 | Japan . | |
| 60-75826 | 4/1985 | Japan . | |
| 60-162282 | 8/1985 | Japan . | |
| 60-165622 | 8/1985 | Japan | 359/40 |
| 60-202422 | 10/1985 | Japan . | |
| 60-203915 | 10/1985 | Japan . | |
| 60-241024 | 11/1985 | Japan | 359/40 |
| 61-169880 | 7/1986 | Japan . | |
| 61-185785 | 8/1986 | Japan . | |
| 61-42241 | 9/1986 | Japan . | |
| 61-232420 | 10/1986 | Japan . | |
| 63-49786 | 3/1988 | Japan . | |
| 63-85589 | 4/1988 | Japan . | |
| 63-165838 | 7/1988 | Japan . | |
| 1-11205 | 1/1989 | Japan . | |

(List continued on next page.)

OTHER PUBLICATIONS

Chemical Abstracts 119: 140913a (Oct. 19, 1993) for JP S-117348 (May 1993).

Ultra-Wide Viewing Angle Rear Projection Television Screen; R. Bradley, Jr., IEEE Transactions Consumer Electronics, vol. CD-31, No. 3 (Aug. 1985), pp. 185-193.

*Primary Examiner*—Anita Pellman Gross
*Attorney, Agent, or Firm*—Melanie L. Brown

[57] ABSTRACT

A direct view display including a light generating means for generating light, a modulating means for modulating light from said light generating means to form an image, and an image display means for displaying said image from said modulating means positioned adjacent to the light output surface of said modulating means, said display means comprising an array of tapered optical waveguides on a planar substrate the tapered end of each of said waveguides extending outward from said substrate and having a light input surface adjacent said substrate and a light output surface distal from said light input surface. The area of the light input surface of each waveguide is greater than the area of its light output surface, and the center-to-center distance between the light input surfaces of adjacent waveguides in said array is equal to the center-to-center distance between the light output surfaces thereof, so that the angular distribution of light emerging from the output surfaces of the waveguides is larger than the angular distribution of light entering the waveguides. Also, the waveguides in said array are separated by interstitial regions with a lower refractive index than the refractive index of said waveguides.

37 Claims, 17 Drawing Sheets

U.S. PATENT DOCUMENTS

| | | | |
|---|---|---|---|
| 3,767,445 | 10/1973 | Chandross et al. | 117/8 |
| 4,290,632 | 12/1988 | Miyakawa et al. | 359/40 |
| 4,298,246 | 11/1981 | Iwamura | 359/448 |
| 4,299,447 | 11/1981 | Soltan et al. | 350/334 |
| 4,379,617 | 4/1983 | Funakoshi et al. | 359/453 |
| 4,573,764 | 3/1986 | Bradley | 359/453 |
| 4,605,283 | 8/1986 | Stanton | 359/453 |
| 4,606,609 | 4/1986 | Hong | 359/455 |
| 4,609,252 | 9/1986 | Wong et al. | 385/130 |
| 4,613,560 | 9/1986 | Dueber et al. | 430/286 |
| 4,623,676 | 11/1986 | Kistner | 522/15 |
| 4,640,736 | 2/1987 | Holman | 156/603 |
| 4,660,930 | 4/1987 | van der Hoorn et al. | 359/452 |
| 4,666,248 | 5/1987 | van de Ven | 359/457 |
| 4,679,900 | 7/1987 | McKechnie et al. | 359/453 |
| 4,682,853 | 7/1987 | Broer et al. | 359/453 |
| 4,688,093 | 8/1987 | van der Staak et al. | 359/453 |
| 4,692,359 | 9/1987 | Fitzpatrick | 427/550 |
| 4,695,135 | 9/1987 | Den Exter Blokland et al. | 359/742 |
| 4,701,019 | 10/1987 | Fitzpatrick | 359/453 |
| 4,701,020 | 10/1987 | Bradley, Jr. | 359/457 |
| 4,712,854 | 12/1987 | Mikami et al. | 385/143 |
| 4,721,361 | 1/1988 | van de Ven | 359/457 |
| 4,725,448 | 2/1988 | Fitzpatrick | 427/469 |
| 4,730,897 | 3/1988 | McKechnie et al. | 359/452 |
| 4,751,509 | 6/1988 | Kubota et al. | 359/95 |
| 4,762,393 | 8/1988 | Gerritsen et al. | 359/456 |
| 4,767,186 | 8/1988 | Bradley, Jr. et al. | 359/452 |
| 4,776,670 | 10/1988 | Kessels et al. | 359/819 |
| 4,783,136 | 11/1988 | Elman et al. | 385/130 |
| 4,864,390 | 9/1989 | McKechnie et al. | 348/751 |
| 4,902,086 | 2/1990 | Henry et al. | 385/130 |
| 4,905,076 | 2/1990 | Annegarn et al. | 348/58 |
| 4,942,112 | 7/1990 | Monroe et al. | 430/282 |
| 4,955,937 | 9/1990 | Dona et al. | 82/1.11 |
| 4,956,265 | 9/1990 | Klun et al. | 430/283 |
| 4,963,471 | 10/1990 | Trout et al. | 430/282 |
| 4,964,695 | 10/1990 | Bradley, Jr. | 359/455 |
| 5,005,945 | 4/1991 | van de Ven | 359/456 |
| 5,052,783 | 10/1991 | Hanada | 359/40 |
| 5,061,769 | 10/1991 | Aharoni | 526/245 |
| 5,076,661 | 12/1991 | Bradley | 359/456 |
| 5,101,279 | 3/1992 | Kurematsu et al. | 359/40 |
| 5,113,471 | 5/1992 | Inaishi et al. | 385/126 |
| 5,118,579 | 6/1992 | Aharoni et al. | 428/422 |
| 5,132,830 | 7/1992 | Fukutani et al. | 359/67 |
| 5,136,678 | 8/1992 | Yoshimura | 385/132 |
| 5,136,682 | 8/1992 | Moyer et al. | 385/141 |
| 5,137,800 | 8/1992 | Neckers et al. | 430/281 |
| 5,138,687 | 8/1992 | Horie et al. | 385/129 |
| 5,139,879 | 8/1992 | Aharoni et al. | 428/422 |
| 5,151,801 | 9/1992 | Hiroshima | 359/40 |
| 5,159,478 | 10/1992 | Akiyama et al. | 359/69 |
| 5,178,955 | 1/1993 | Aharoni et al. | 428/421 |
| 5,230,990 | 7/1993 | Iwasaki et al. | 430/321 |
| 5,288,589 | 2/1994 | McKeever et al. | 430/262 |

FOREIGN PATENT DOCUMENTS

| | | |
|---|---|---|
| 1-189608 | 7/1989 | Japan . |
| 2-54204 | 2/1990 | Japan . |
| 3-245106 | 10/1991 | Japan . |
| 4-119322 | 4/1992 | Japan . |
| 4-182691 | 6/1992 | Japan . |
| 4-184384 | 7/1992 | Japan . |
| 5-24121 | 2/1993 | Japan . |
| 5-80319 | 4/1993 | Japan . |
| 5-249450 | 9/1993 | Japan . |
| 6-88959 | 3/1994 | Japan . |
| 6-265866 | 9/1994 | Japan . |
| 1017471 | 1/1966 | United Kingdom . |

DIRECT VIEW DISPLAY DEVICE WITH ARRAY OF TAPERED WAVEGUIDE ON VIEWER SIDE

BACKGROUND OF THE INVENTION

1. Field of the Invention

This invention is directed to a direct view display devices as for example, a liquid crystal display device. More preferably, this invention relates to such displays which incorporate arrays of tapered optical waveguides to achieve relatively high light transmission, high contrast, and large viewing angles.

2. Description of Related Art

Display devices as for example projection display devices, off screen display devices and direct view displays are known. See for example, EPO 0 525 755 A1; U.S. Pat. Nos. 4,659,185; 5,132,830; 5,159,478; Japanese Publication Nos. 245106 and 42241. Such displays are used in a wide range of applications which include computer terminals, airplane cockpit displays, automotive instrument panels, televisions and other devices that provide text, graphics or video information. Such displays can replace conventional cathode ray tube displays due to advantages of smaller volume, reduced weight, and lower power consumption.

Conventional direct view displays as for example liquid crystal displays suffer from a number of inherent disadvantages. For example, at high viewing angles (large angles from the direction normal to the surface of the display), such displays suffer from low contrast and changes in visual chromaticity as the viewing angle changes.

SUMMARY OF THE INVENTION

The present invention is directed to a direct view flat panel display comprising:

(a) light generating means for generating light;

(b) modulating means for modulating light from said light generating means to form an image; and (c) image display means for displaying said image from said modulating means positioned adjacent to the light output surface of said modulating means, said display means comprising an array of tapered optical waveguides on a planar substrate the tapered end of each of said waveguides extending outward from said substrate and having a light input surface adjacent said substrate and a light output surface distal from said light input surface, wherein:

(i) the area of the light input surface of each waveguide is greater than the area of its light output surface, and the center-to-center distance between the light input surfaces of adjacent waveguides in said array is equal to the center-to-center distance between the light output surfaces thereof, so that the angular distribution of light emerging from the output surfaces of the waveguides is larger than the angular distribution of light entering the waveguides; and (ii) the waveguides in said array are separated by interstitial regions with a lower refractive index than the refractive index of said waveguides.

In the preferred embodiments of this invention, the device further comprises (d) input light polarizing means positioned between said light generating means and said modulating means for polarizing light generated by said generating means; and (e) output light polarizing means positioned between said modulating means and said image display means for polarizing light emitted from said modulating means.

In another preferred embodiment of this invention, the flat panel display of this invention further comprises (f) light-collimating means for collimating light from said generating means positioned adjacent to the light input surface of the input polarizer of said modulating means, said light-collimating display means comprising an array of tapered optical waveguides on a planar substrate, the tapered end of each waveguide extending outward from said substrate and having a light output surface adjacent said substrate and a light input surface distal said light output surface, wherein:

(i) the area of the light input surface of each waveguide is smaller than the area of its light output surface, and the center-to-center distance between the light input surfaces of adjacent waveguides in said array is equal to the center-to-center distance between the light output surfaces thereof, so that the divergent light from an uncollimated illumination system is partially collimated upon emergence from their output surfaces; and (ii) the waveguides in said array are separated by interstitial regions with a lower refractive index than the refractive index of said waveguides.

The direct view display device of this invention exhibits several advantages over known devices. For example, the device of this invention has relatively high contrast and reduced changes in visual chromaticity as a function of viewing angle.

BRIEF DESCRIPTION OF THE DRAWINGS

The invention will be more fully understood and further advantages will become apparent when reference is made to the following detailed description of the invention and the accompanying drawings in which.

DESCRIPTION OF THE PREFERRED EMBODIMENTS

The present invention is directed to a direct-view device of the type wherein the image being displayed is generated in the immediate proximity of the display screen. Such devices include emissive display devices as for example gas discharge, plasma panel, electroluminescent, light-emitting diode, diode laser, vacuum fluorescent and flat cathode-ray tube and non-emissive display devices as for example, liquid crystalline, electrochromism, colloidal suspension, electroactive solids and electromechanical. The device of This invention has improved display means which obviates all or portion of the deficiencies of known direct view flat panel image display devices such as low contrast and large changes in visual chromaticity at high viewing angles, i.e. large angles from the direction normal to the surface of the display.

The preferred embodiments of this invention will be better understood by those of skill in the art by reference to the above figures. The preferred embodiments of this invention illustrated in the figures are not intended to be exhaustive or to limit the invention to the precise form disclosed. They are chosen to describe or to best explain the principles of the invention, and its application and practical use to thereby enable others skilled in the art to best utilize the invention.

Figure 1:
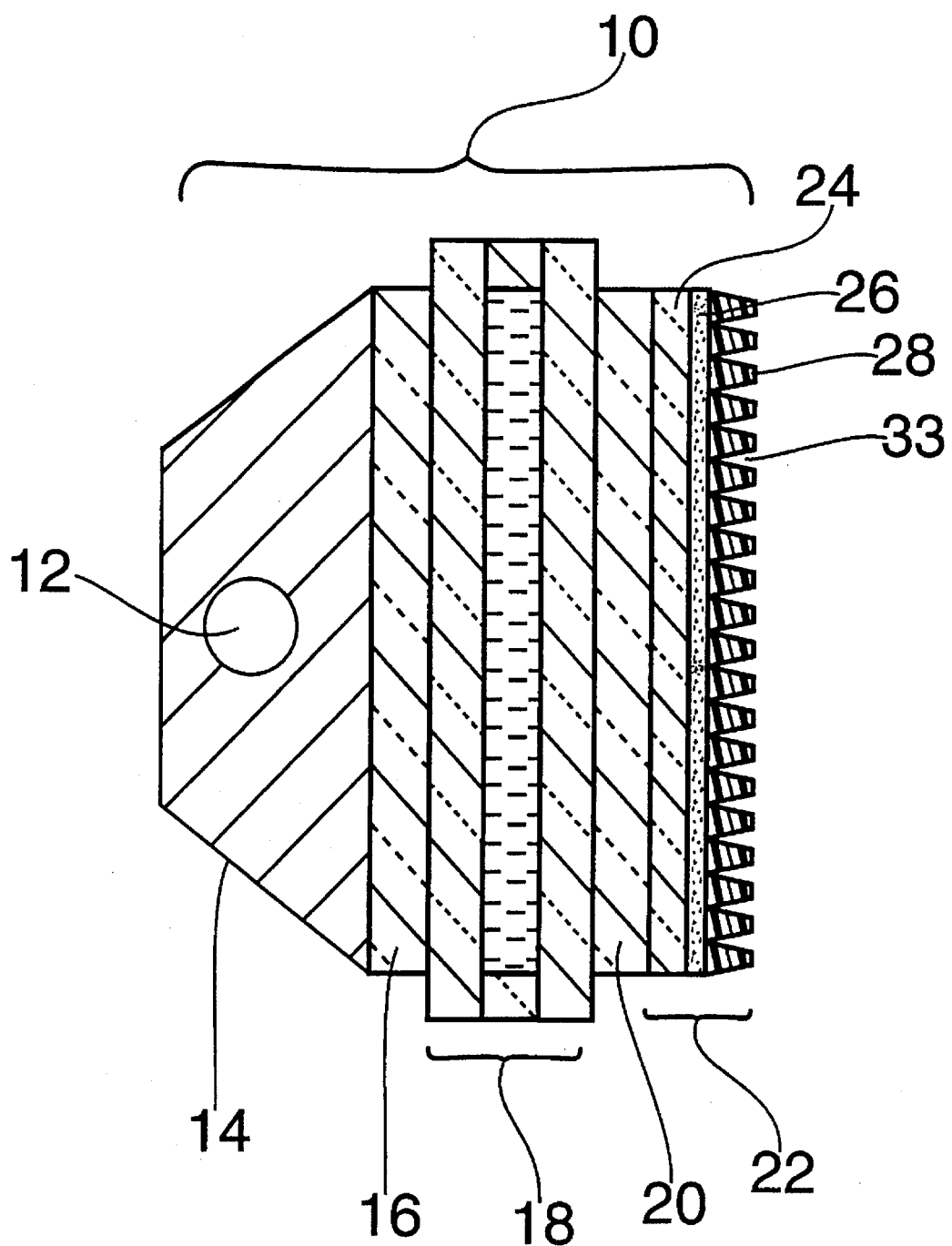
FIG. 1 is a cross-sectional view of an embodiment of a preferred liquid crystal display constructed in accordance with the present invention.

One preferred embodiment of a display of this invention is shown in FIG. 1 represented by the number 10. The display is composed of a light generating means 12, optional reflecting and/or diffusing element 14, optional input light polarizing means 16, a modulating means 18, optional output light polarizing means 20 and image display means 22 positioned in contact with the output surface of polarizer 20. Image display means 22 is comprised of substrate 24, adhesion promoting layer 26 and an array of tapered waveguides 28 separated by interstitial regions 33. The exact features of light generating means 12, diffusing means 14, input light polarizing means 16, modulating means 18 and output light polarizing means 20 are not critical and can vary widely and any such elements conventionally used in the art may be employed in the practice of this invention. Illustrative of useful light generating means 12 are lasers, fluorescent tubes, light emitting diodes, incandescent lights, sunlight and the like.

Useful reflecting and/or diffusing means 14 include metallic reflectors, metal coated glass mirrors, phosphor screens, reflectors coated with white surfaces such as titanium dioxide layers and the like.

Exemplary of useful input light polarizing means 16 and output light polarizing means 20 are plastic sheet polaroid material and the like, Illustrative of useful modulating means 18 are liquid crystal cells, electrochromic modulators, and lead zirconium lanthanum titanate (PZLT) modulators. For emissive display devices as for example plasma panel displays the light generating means 12 and the light modulating means 18 can be functionally combined. Preferred modulating means 18 for use in the practice of this invention are liquid crystal cells. The liquid crystal material in liquid crystal cell 18 can vary widely and can be one of several types including but not limited to twisted nematic (TN) material, super-twisted nematic (STN) material and polymer dispersed liquid crystal (PDLC) material.

The structure of image display means 22 and its positioning is critical to the improved contrast and viewing angle and chromaticity provided by the apparatus of this invention. In FIG. 1, image display means 22 is positioned in "proximity" to polarizing means 20 which itself is in "proximity" with modulating means 18. In those embodiments of the invention which do not include optional polarizing means 20, image displays means 22 is positioned in "proximity" to modulating means 18. As used herein, "proximity" means in intimate physical contact or closely positioned (preferably within about 1 in., more preferably within about 0.75 in., most preferably within about 0.5 in. and within about 0.25 in. in the embodiments of choice) so that light does not have to be "projected" from one element to the next through space as in the case with projection systems such as those described in U.S. Pat. Nos. 4,573,764; 4,688,093; 4,955,937; and 5,005,945. The device of FIG. 1 includes optional polarizing means 20 and when such polarizing means 20 is not included, the image display display means 22 is positioned in proximity to modulating means 18.

Figure 2:
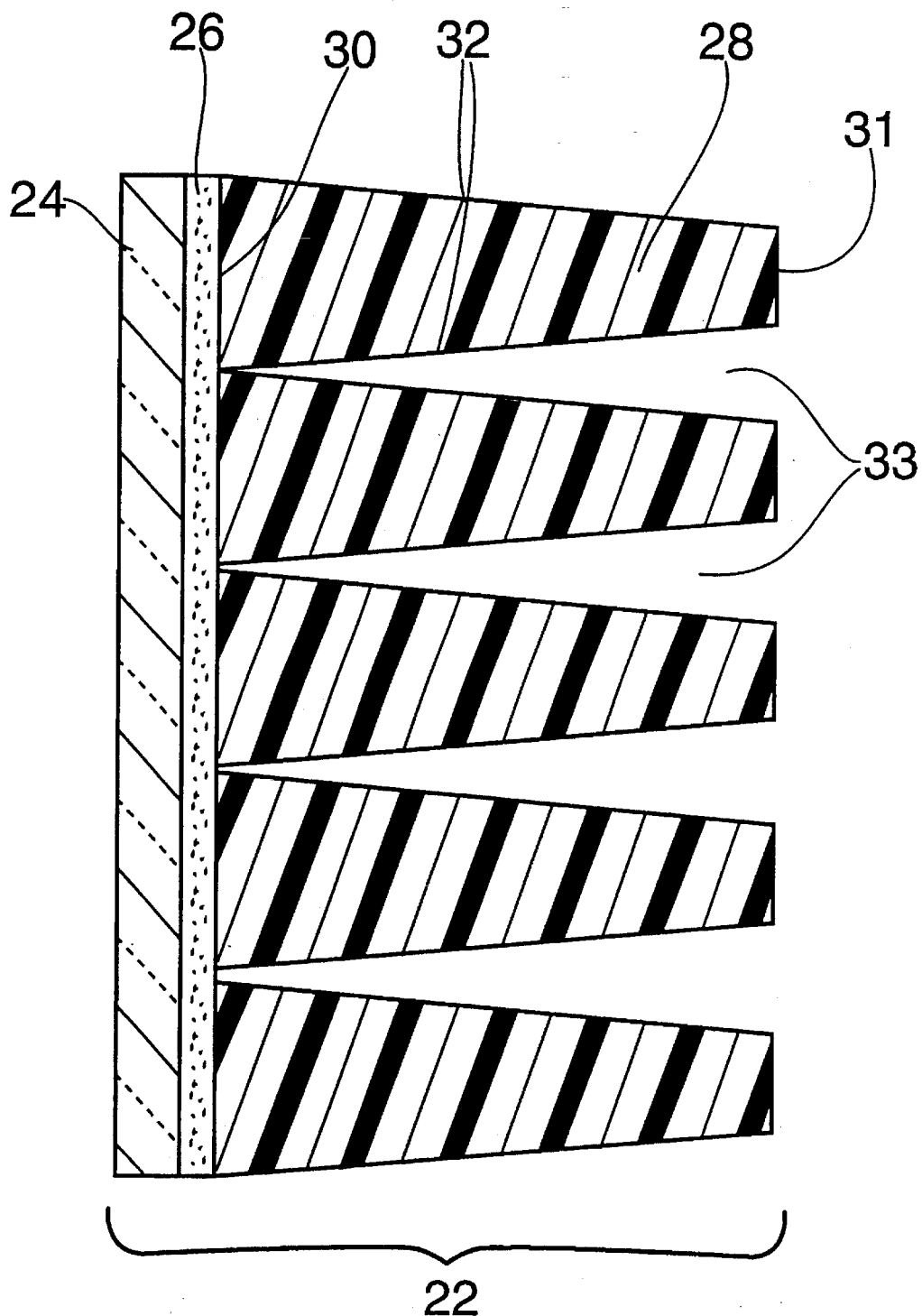
FIG. 2 is an exploded sectional view of an array of tapered waveguides with straight sidewalls.

FIG. 2 shows an exploded sectional view of image display means 22. The image display means is composed of a substrate 24, adhesion promoting layer 26 and an array of tapered waveguides 28. The tapered waveguides 28 have a light input surface 30, light output surface 31, sidewalls 32 and are separated by interstitial regions 33 with a lower refractive index than the refractive index of said waveguides. Input surface area 30 of each tapered waveguide 28 is positioned adjacent to the adhesion promoting layer 26 and is larger than output surface area 31 of each waveguide 28, which in the embodiments of FIGS. 1 and 2 results in a tapered structure. The structure and positioning of waveguides 28 are critical. As shown in FIG. 2, the area of light input surface 30 of each waveguide 28 is greater than the area of its light output surface 31, and the center-to-center distance between light input surfaces 30 of adjacent waveguides 28 in said array is equal or substantially equal to the center-to-center distance between light output surfaces 31 thereof, so that the angular distribution of light emerging from output surfaces 31 of waveguides 28 is larger than the angular distribution of light entering input surfaces 30 of waveguides 28. In order that the resolution of the image formed by modulating means 18 not be degraded as it traverses image display means 22, it is preferred that the center-to-center .distance between light input surfaces 31 of adjacent waveguides 28 is equal to or less than the center-to-center distance between adjacent pixels of modulating means 18. In FIG. 2, sidewalls 32 are shown as straight. However, shape of sidewalls 32 is not critical and sidewalls can be straight or curved.

Figure 3:
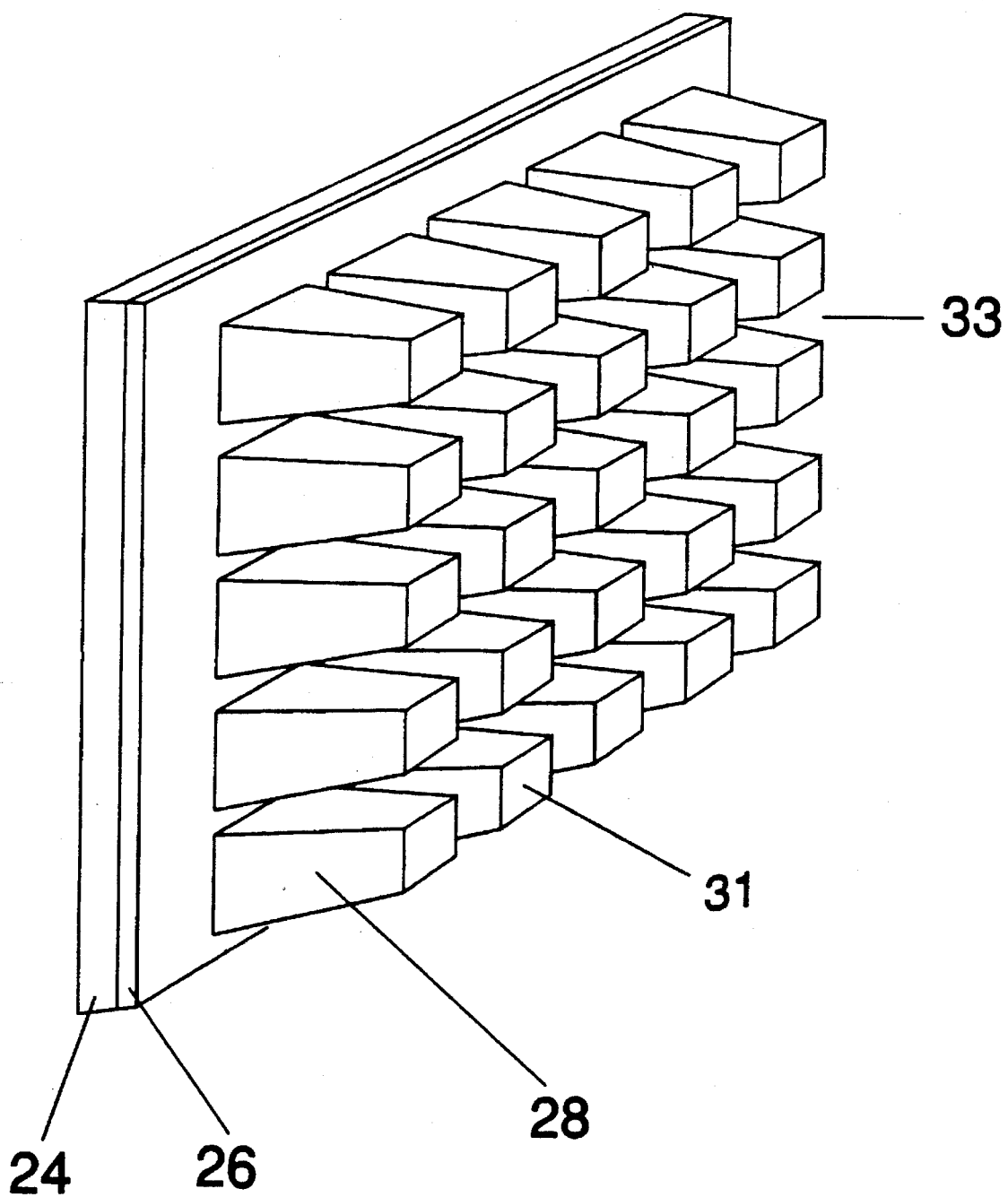
FIG. 3 is an array of tapered waveguides with rectangular cross-sections viewed in perspective.
Figure 4:
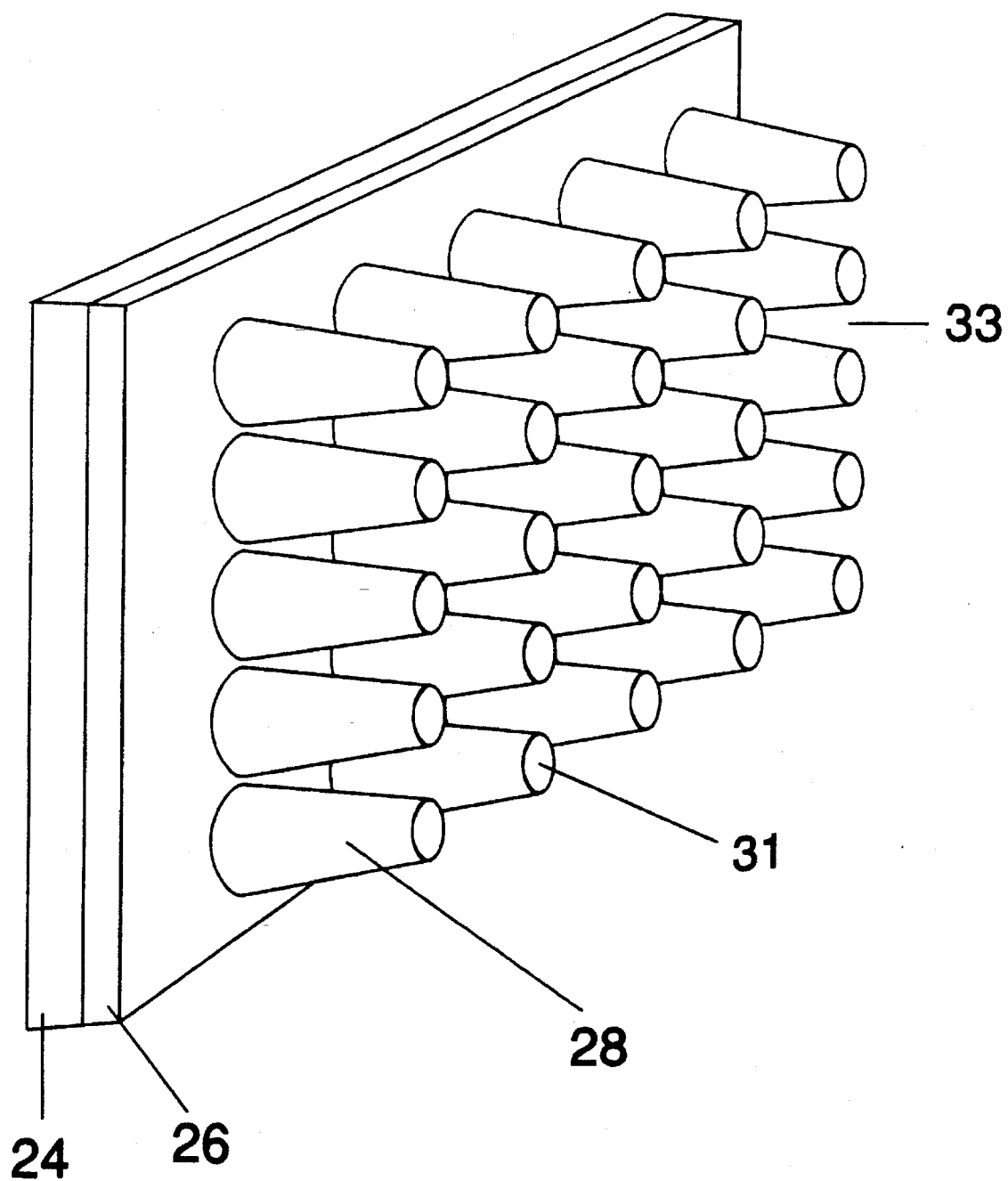
FIG. 4 is an array of tapered waveguides with round cross-sections viewed in perspective.

The cross-section of a tapered waveguide 28 in a plane parallel to the surface of image display means 22 may have any shape including a square, a rectangle, any equilateral polygon, a circle or an oval. FIG. 3 shows an array composed of tapered waveguides 28 with rectangular cross-sections viewed in perspective. FIG. 4 shows a similar view of an array composed of tapered waveguides 28 which have circular cross-sections. Examples of shapes for the entire waveguide 28 include right circular cones, right oval cones, right square pyramids, and right rectangular pyramids, any of which may be whole or truncated.

The optical properties, i.e. contrast and change in chromaticity as a function of viewing angle, of an array of tapered waveguides 28 are determined by the shape, size and physical arrangement of the individual waveguides 28. In FIG. 2, the center-to-center distance between light input surfaces 30 of adjacent waveguides 28 is equal or substantially equal to the center-to-center distance between the light output surfaces 31 of adjacent waveguides 28. Therefore, an optical image entering the array at input surfaces 30 will be neither magnified or demagnified after traversing the array.

Substrate 24 of waveguide array 22 in FIG. 2 is transparent to light within the wavelength range from about 400 to about 700 nm. The index of refraction of the substrate may range from about 1.45 to about 1.65. The most preferred index of refraction is from about 1.50 to about 1.60. The substrate may be made from any transparent solid material. Preferred materials include transparent polymers, glass and fused silica. Desired characteristics of these materials include mechanical and optical stability at typical operating temperatures of the device. Compared with glass, transparent polymers have the added advantage of structural flexibility which allows display means 22 to be formed in large sheets and then cut and laminated to the output polarizer of the liquid crystal display. Most preferred materials for substrate 24 are glass and polyester.

The tapered optical waveguides 28 of the arrays shown in FIG. 2, FIG. 3 and FIG. 4 are formed from a transparent solid material having a higher index of refraction interstitial regions 33 between the waveguides. Light rays which enter waveguide 28 through input surface 30 (shown in FIG. 2) and thereafter are incident on side surfaces 32 of the waveguide at angles greater than the critical angle (as defined by Snell's Law) will undergo one or more total internal reflections from the side surfaces 32 and, in most cases, emerge from waveguide 28 through output surface 31. A few light rays may pass through the side surfaces 32 or be reflected back to the input surface 30. The operational function of waveguide 28 differs from a lens in that a lens does not utilize total internal reflection.

When waveguide 28 has a taper such that the area of the output surface 31 is smaller than the area of input surface 30, the angular distribution of the light emerging from output surface 31 will be larger than the angular distribution of the light entering the input surface 30. Image display means 22 having an array of tapered waveguides 28 placed at the output surface of modulating means 18 will alter the angular distribution of output light from modulating means 18 such that the image from modulating means 18 can be viewed at higher angles. It is preferred that the area of output surface 31 of each waveguide 28 be from about 1 to about 50% of the area of the input surface 30. It is more preferred that the area of the output surface 31 be from about 3 to about 25% of the area of the input surface 30. It is most preferred that the area of output surface 31 be from about 4 to about 12% of the area of input surface 30.

In order that image display means 22 has high overall light throughput, it is preferred that the sum of the areas for all waveguide input surfaces 30 be greater than 40% of the total area of substrate 24 of the array. It is more preferred that the sum of the areas for all waveguide input surfaces 30 in image display means 22 be greater than 60% of the total area of substrate 24 of the array. It is most preferred that the sum of the areas for all waveguide input surfaces 30 in image display means 22 be greater than 80% of the total area of substrate 24 of the array.

Tapered waveguides 28 can be constructed from any transparent solid polymer material. Preferred materials have an index of refraction between about 1.45 and about 1.65 and include polymethylmethacrylate, polycarbonate, polyester, polystyrene and polymers formed by photopolymerization of acrylate monomers. More preferred materials have an index of refraction between about 1.50 and about 1.60 and include polymers formed by photopolymerization of acrylate monomer mixtures composed of urethane acrylates and methacrylates, ester acrylates and methacrylates, epoxy acrylates and methacrylates, (poly) ethylene glycol acrylates and methacrylates and vinyl containing organic monomers. Useful monomers include methyl methacrylate, n-butyl acrylate, 2-ethylhexyl acrylate, isodecyl acylate, 2-hydroxyethyl acrylate, 2-hydroxypropyl acrylate, cyclohexyl acrylate, 1,4-butanediol diacrylate, ethoxylated bisphenol A diacrylate, neopentylglycol diacrylate, diethyleneglycol diacrylate, diethylene glycol dimethacrylate, 1,6-hexanediol diacrylate, trimethylol propane triacrylate, pentaerythritol triacrylate and pentaerythritol tetra-acrylate. Especially useful are mixtures wherein at least one monomer is a multi-functional monomer such as a diacrylate or triacrylate, as these will produce a network of crosslinks within the reacted photopolymer. The most preferred materials for use in the method of the invention are crosslinked polymers formed by photopolymerizing mixtures of ethoxylated bisphenol A diacrylate and trimethylol propane triacrylate. The index of refraction of the most preferred materials ranges from about 1.53 to about 1.56. It is not essential that the refractive index of the transparent solid material be homogeneous throughout the waveguide element. It may be advantageous to cause to be present, inhomogeneities in refractive index, such as striations or scattering particles or domains, as these inhomogeneities may further increase the divergence of light from the output of the waveguide array.

The index of refraction of interstitial region 33 between the waveguides 28 must be less than the index of refraction of the waveguides. Preferred materials for interstitial regions include air, with an index of refraction of 1.00, and fluoropolymer materials with an index of refraction ranging from about 1.30 to about 1.40. The most preferred material is air.

The adhesion promoting layer 26 of the array of tapered waveguides 28 shown in FIG. 2 is an organic material that is light transmissive and that causes the waveguides 28, especially waveguides formed from polymers as for example photocrosslinked acrylate monomer materials, to adhere strongly to the substrate 24. Such materials are well known to those skilled in the art and will not be described herein in great detail. For example, if substrate 24 is glass and waveguides 28 are formed by photocrosslinking acrylate monomer materials, then appropriate adhesion promoting layers can be formed by reacting the glass surface with certain types of silane compounds including 3-(trimethoxysilyl)propyl methacrylate or 3-acryloxypropyl trichlorosilane. The thickness of adhesion promotion layer 26 is not critical and can vary widely. Usually, the thickness of the layer is as used in conventional direct view flat panel display devices. In the preferred embodiments of the invention, adhesion promoting layer 26 is less than about 1 micrometer thick.

Figure 5:
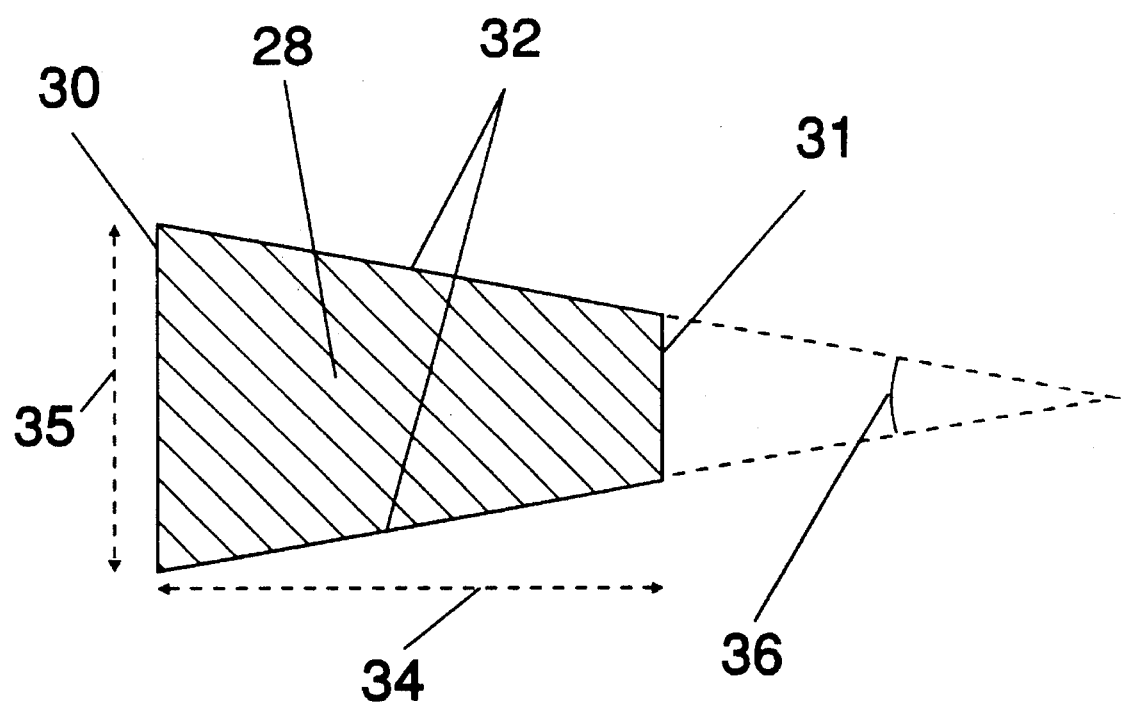
FIG. 5 is a sectional view of a single tapered waveguide with straight sidewalls.

A single tapered waveguide 28 with input surface 30, output surface 31 and straight sidewalls 32 is shown in FIG. 5. If tapered straight sidewalls 32 in the drawing are extended until they intersect, they form taper angle 36. Desired values for taper angle 36 range from about 2 degrees to about 14 degrees. More preferred values for taper angle 36 range from about 4 degrees to about 12 degrees. Most preferred values for taper angle 33 are from about 6 degrees to about 10 degrees.

The length of tapered waveguide 28 has dimension 34. Dimension 35 is the minimum transverse distance across waveguide input surface 30. For example, if input surface 30 has the shape of a square, dimension 35 is the length of one side of the square. If input surface 30 has a rectangular shape, dimension 35 is the smaller of the two side dimensions of the rectangle. The specific values for dimension 35 may vary widely depending on the center-to-center distance between adjacent pixels of modulating means 18. In order that the resolution of the image formed by modulating means 18 not be degraded, dimension 35 should be equal to or less than the center-to-center distance between adjacent pixels of modulating means 18. For example, if the center-to-center distance between adjacent pixels in modulating means 18 is 200 microns, then dimension 35 is generally in the range from about 5 microns to about 200 microns, more preferably from about 15 microns to about 200 microns and most preferably from about 25 microns to about 100 microns.

Once dimension 35 is chosen, dimension 34 can be specified by the ratio of dimension 34 to dimension 35. The ratio of dimension 34 to dimension 35 may vary widely depending on how much one wishes to increase the angular distribution of light emerging from the output surface 31 compared to the angular distribution of light entering input surface 30. The ratio of dimension 34 to dimension 35 is usually from about 0.25 to about 20. It is more preferred that the ratio of dimension 34 to dimension 35 be from about 1 to about 8. It is most preferred that the ratio of dimension 34 to dimension 35 be from about 2 to about 4.

Figure 6:
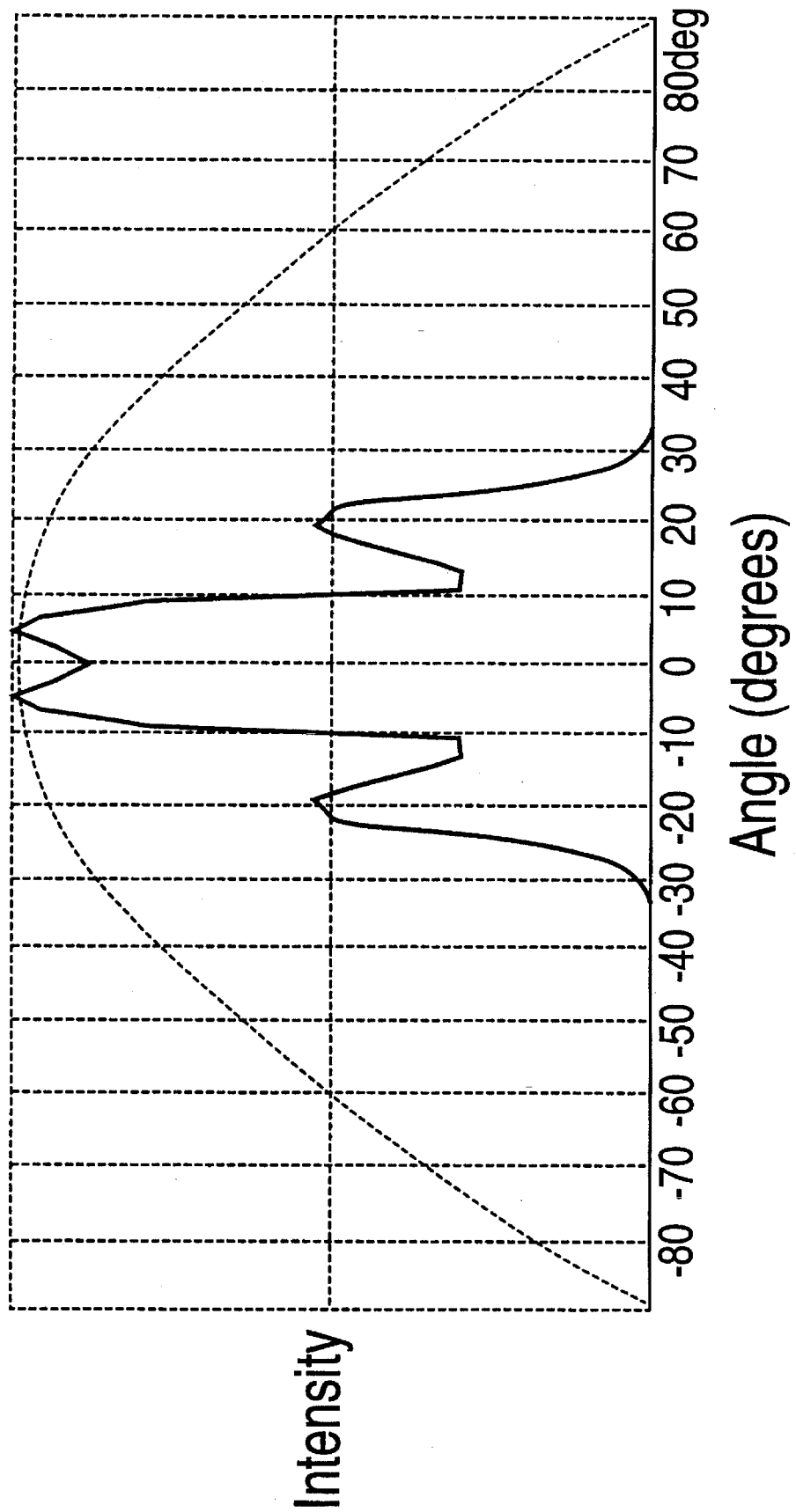
FIG. 6 shows the theoretical non-imaging optical properties of a single tapered waveguide having straight sidewalls and a taper angle of 4.6°.

The non-imaging optical properties of tapered waveguides 28 can be modeled using a non-sequential ray tracing computer program. FIG. 6 shows the output distribution of a particular tapered waveguide assuming an input of 10,000 light rays randomly distributed over the input surface 30 of the cone and randomly distributed over input angles of −10 to +10 degrees. The cone that was modelled in FIG. 6 has a square input surface 30 that is 45 microns on a side, a square output surface 31 that is 25 microns on a side, a length 34 of 125 microns, straight sidewalls 32 and a taper angle 36 of 4.6 degrees. The output area of surface 31 is 31% of the area of input surface 30. The tapered waveguide has improved the light distribution from the input range of −10 to +10 degrees to approximately −30 to +30 degrees.

Figure 7:
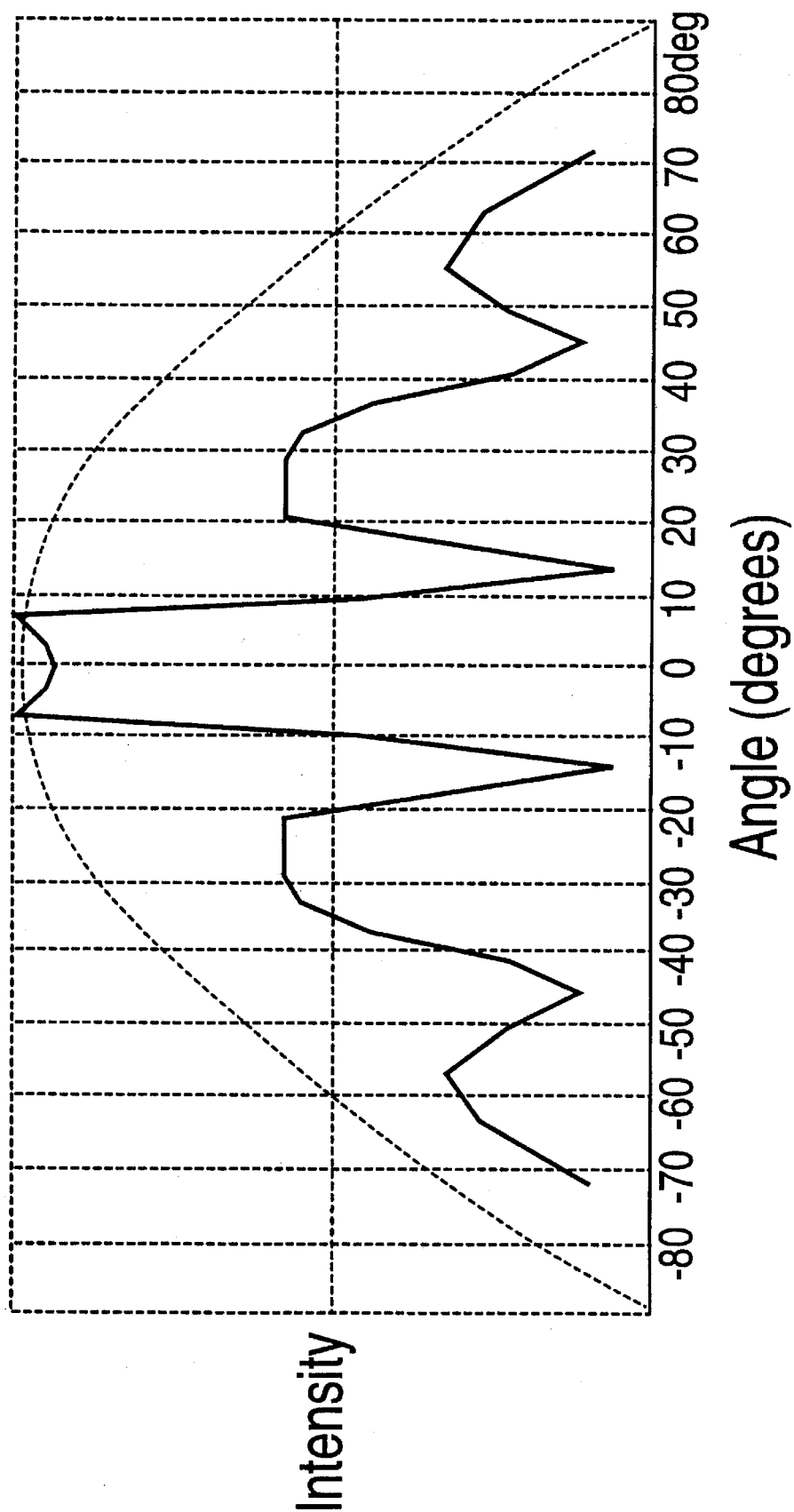
FIG. 7 shows the theoretical non-imaging optical properties of a single tapered waveguide having straight sidewalls and a taper angle of 8°.

The output light distribution of a different and more preferred tapered waveguide configuration is illustrated in FIG. 7. Tapered waveguide 28 has a square input surface 30 that is 45 microns on a side, a square output surface 31 that is 10 microns on a side, a length 34 of 125 microns, straight sidewalls 32 and a taper angle 36 of 8 degrees. The output area of surface 31 is 5% of the area of input surface 30. Using an input light ray distribution of −10 to +10 degrees results in a calculated output distribution of approximately −80 to +80 degrees. The output distribution shown in FIG. 7 is a significant improvement compared to the distribution illustrated in FIG. 6. It should be noted that increasing or decreasing dimensions 34 and 35 by the same multiplicative factor will not change the properties of the output light distribution as long as both the ratio of output area to input area and the taper angle are not changed.

Figure 8:
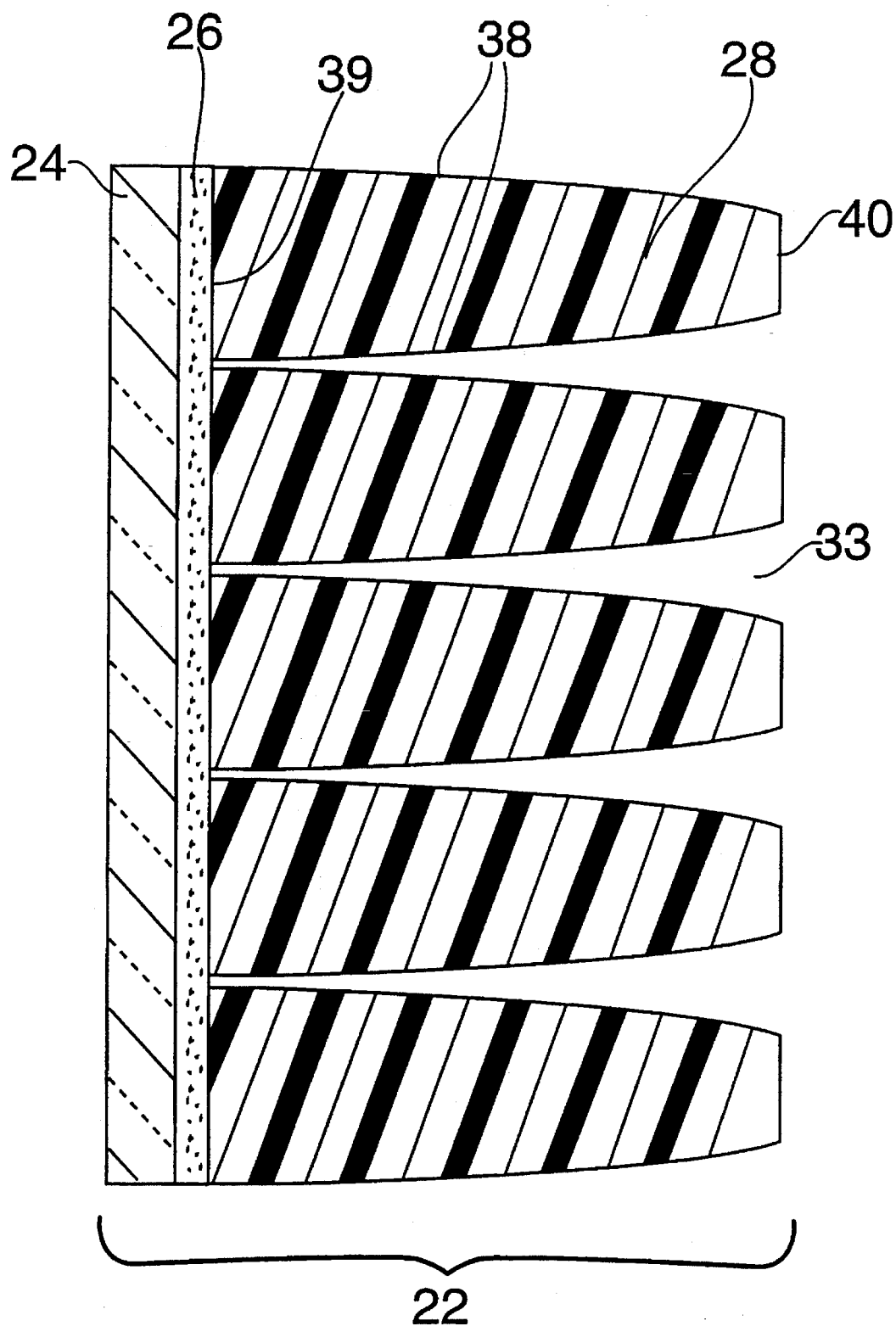
FIG. 8 is an exploded sectional view of an array of tapered waveguides with curved sidewalls.

A further embodiment of the present invention is illustrated in FIG. 8. Image display means 22 is composed of a substrate 24, an adhesion promoting layer 26 and individual tapered waveguides 28. Waveguides 28 have curved sidewalls 38 instead of straight sidewalls as was previously shown in FIG. 2. The preferred relationships between the area of the output surface 40 and the area of the input surface 39 are the same as the preferred relationships previously stated for tapered waveguides 28 with straight sidewalls. In particular, it is preferred that the area of output surface 40 of each waveguide 28 be from about 1 to about 50% of the area of input surface 39. It is more preferred that the area of the output surface 40 be from about 3 to about 25% of the area of input surface 39. It is most preferred that the area of output surface 40 be from about 4 to about 12% of the area of input surface 39.

Figure 9:
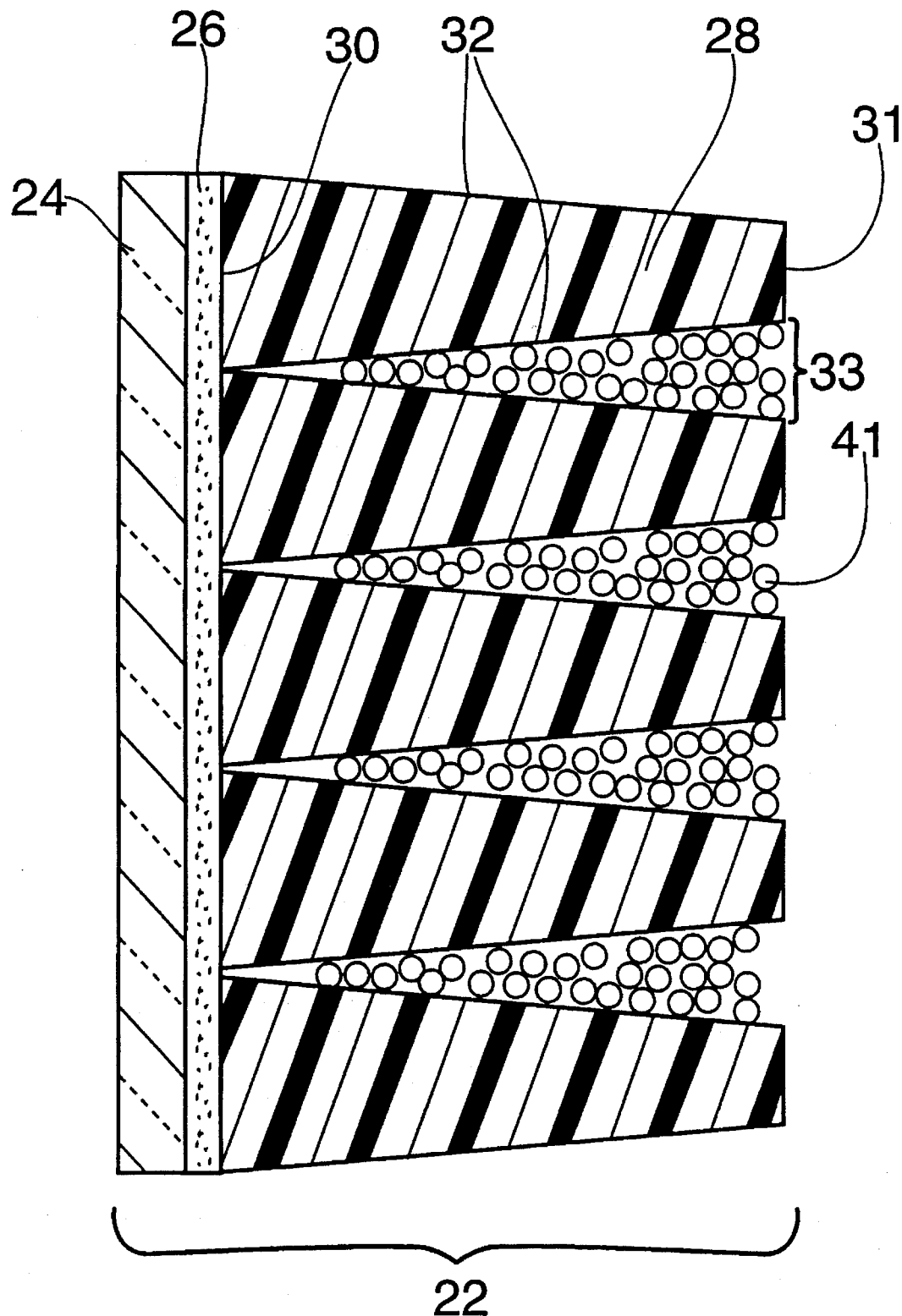
FIG. 9 shows a preferred embodiment of the present invention wherein the interstitial regions between waveguides contain an optically absorptive material.

A preferred embodiment of the present invention in which the interstitial regions 33 between tapered waveguides are filled with a light absorptive material, as for example light absorptive black particulate material 41 is shown in FIG. 9. By utilizing a light absorptive material in interstitial regions 33, the direct view display device has higher contrast and less ambient light is reflected back to the observer. It is preferred that light absorptive particles 41 be used for the interstitial regions rather than a continuous black material in order to minimize the area of black material in contact with side surfaces 32 of the waveguides. A continuous black material in interstitial regions 33 would result in excess absorption loss to light transmitted through waveguides 28. Any light absorptive material can be used to form particles 41. These materials can be identified by a black color.

Figure 10:
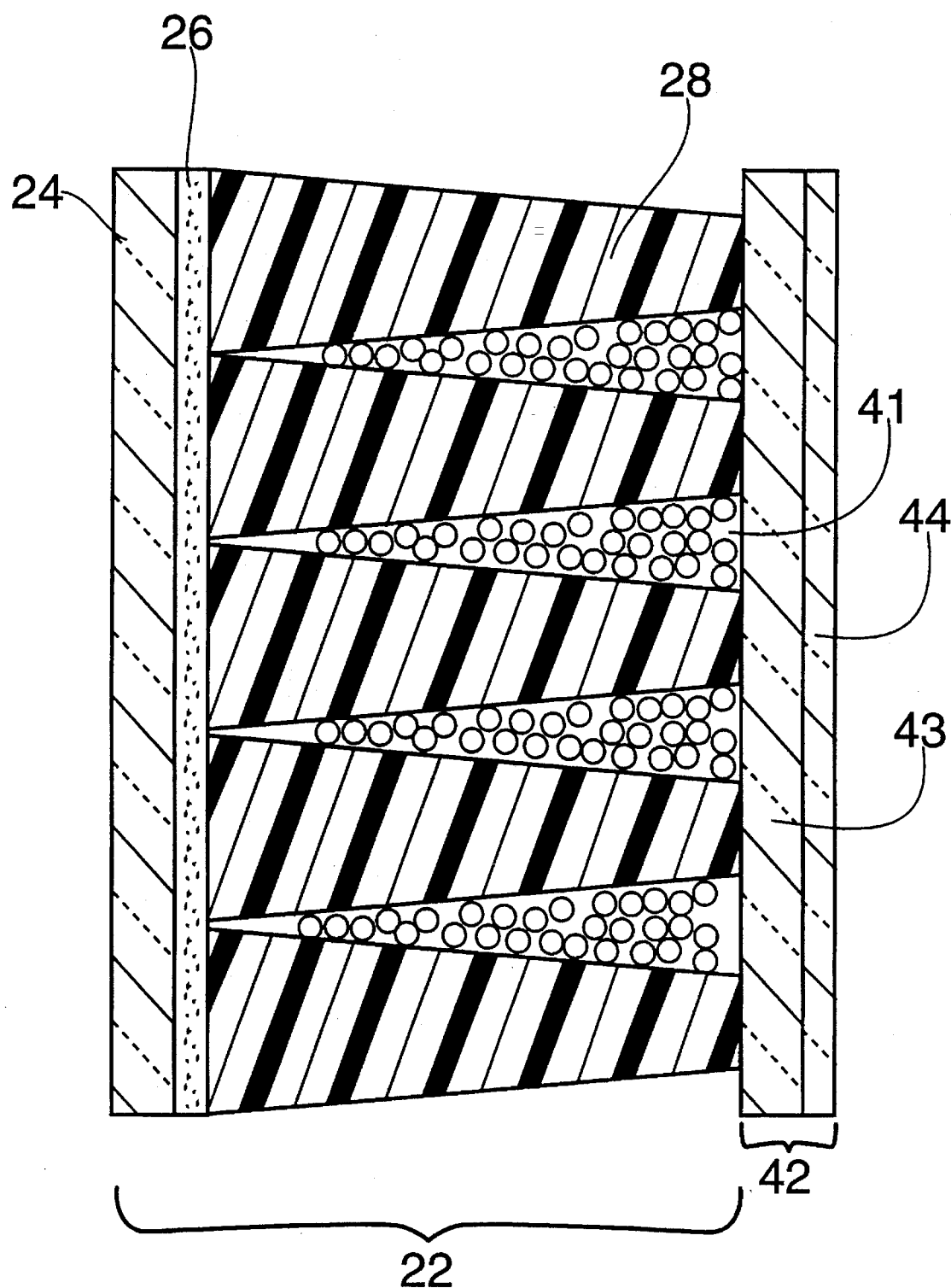
FIG. 10 shows a preferred embodiment of the present invention wherein the output faces of the waveguide array are covered by a transparent protective layer.

A further embodiment of the present invention as shown in FIG. 10 which incorporates protective layer 42 over output ends of the tapered waveguides 28. Protective layer 42 prevents mechanical damage to the output surfaces of waveguides 28 and also serves to confine light absorptive particulate material 41 to interstitial regions 33 between waveguides 28. Protective layer 42 is composed of a transparent backing material 43 as for example the material used to form substrate 24 and optionally and preferably anti-reflective film 44 formed from a material such as magnesium fluoride, which reduces specular reflections of ambient light from the surface of waveguide array 22.

Figure 11:
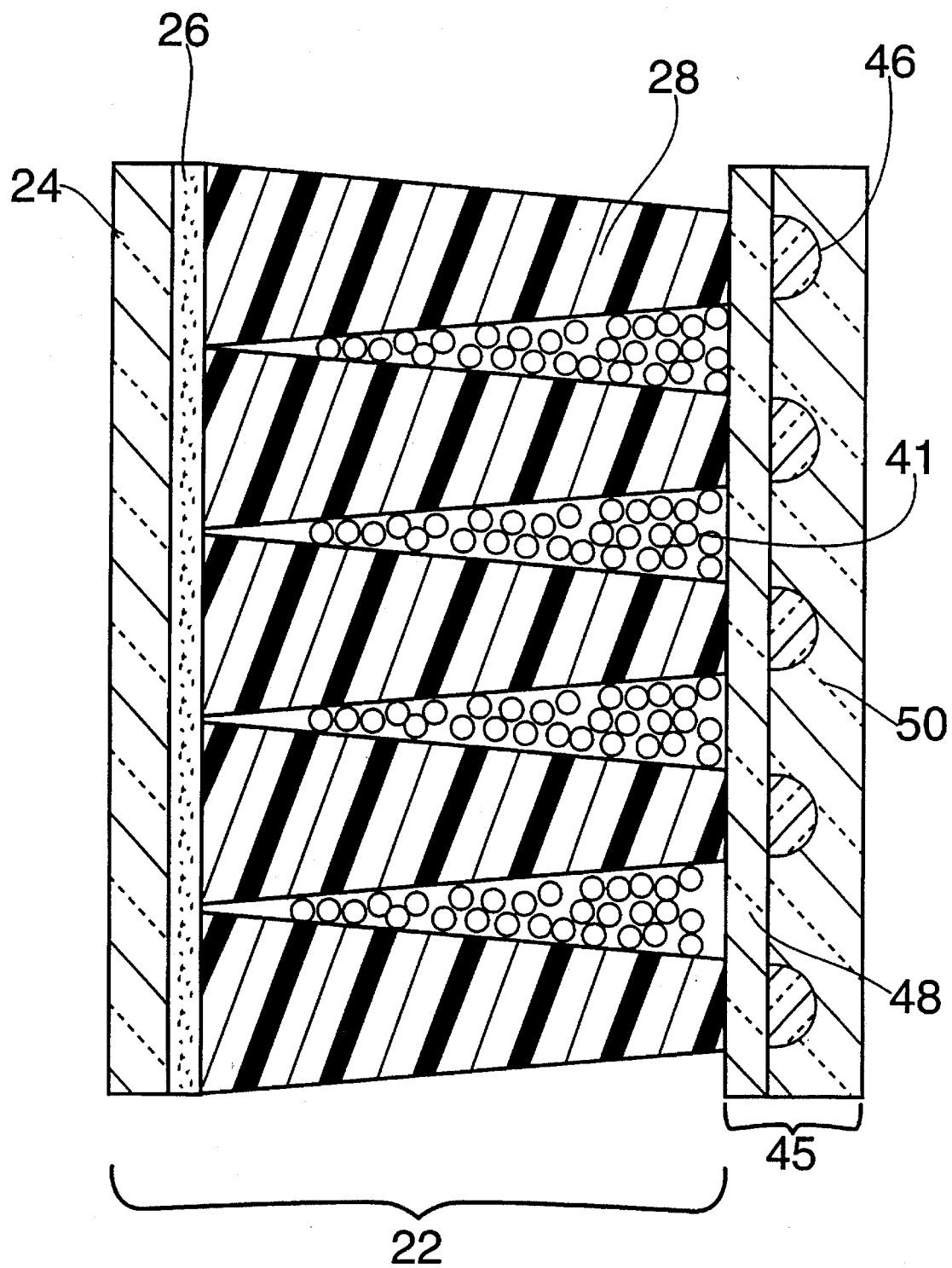
FIG. 11 shows a preferred embodiment of the present invention wherein the output faces of the waveguide array are covered by a transparent protective layer incorporating an array of lenses.

In FIG. 11, an embodiment of the present invention is illustrated which utilizes a protective layer 45 which includes an array of negative lenses 46. Each lens 46 is formed on substrate 48 and is aligned with the output end 31 of waveguide 28. Lens 46 is composed of a material with a lower refractive index than the overcoat layer 50. The advantage of incorporating an array of negative lenses with the image display means 22 is that the resulting display will have increased viewing angle.

Figure 12A:
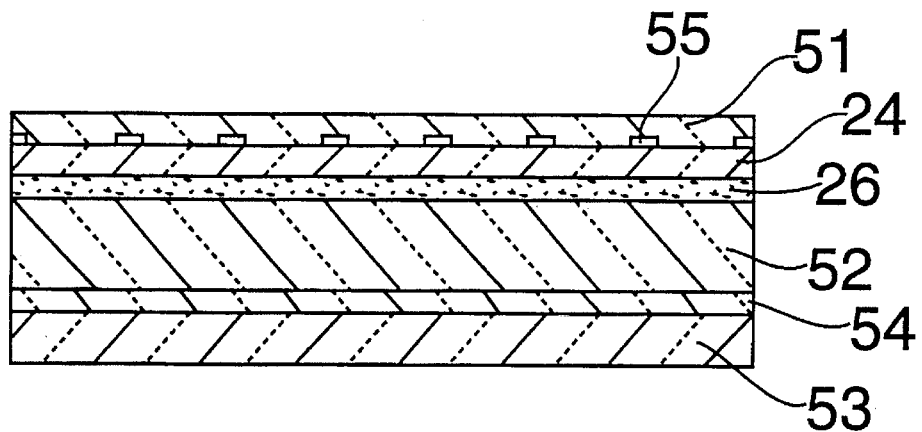
FIGS. 12A, 12B, and 12C illustrate a preferred process for the formation of a tapered waveguide array of the present invention.
Figure 12B:
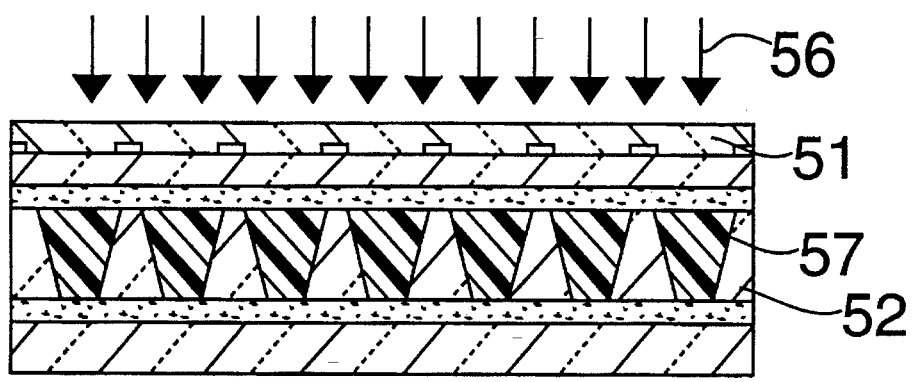
Figure 12C:
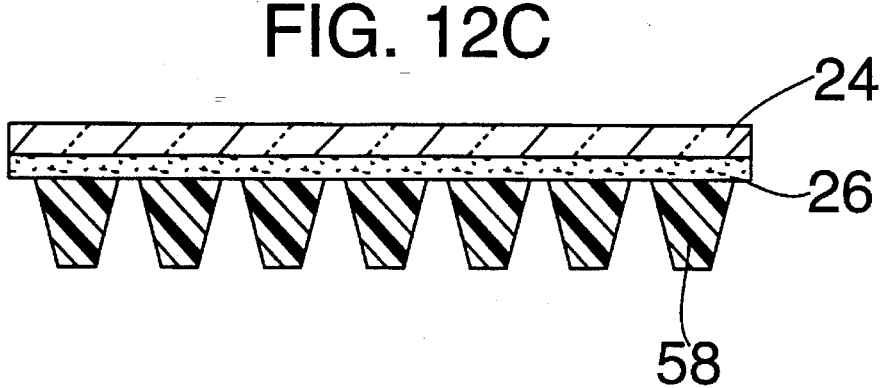

Arrays of tapered optical waveguides can be manufactured by a variety of techniques including injection molding, compression molding, hot roller pressing casting, and photopolymerization processes. A preferred technique is a photopolymerization process illustrated in FIGS. 12A, 12B, and 12C whereby the tapered waveguides are formed by ultraviolet (UV) light irradiation of a layer of photoreactive monomers through a patterned mask. In FIG. 12A, substrate 24 which is coated with adhesion promoting layer 26 is laminated onto the surface of a partially transparent mask 51. This assembly is placed on top of a layer of photoreactive monomers 52 which, in turn, is placed over a bottom support plate 53 having a release layer 54. Mask 51 bears a pattern of opaque areas 55 which allow UV light 56 (FIG. 12B) to pass through only in the areas which comprise the desired pattern of the array of tapered optical waveguides. Ultraviolet light 56, as from a mercury or xenon lamp, is directed to fall on the surface of the image mask 51. Ultraviolet light which passes through the clear areas of the mask causes a photopolymerization reaction in the regions 57 of monomer layer 52 which are directly under the clear image areas of the mask 51. No photoreaction occurs in those areas of monomer layer 52 which are shielded from the UV light by the opaque areas 55 of image mask 51. After irradiation by UV light, both image mask 51 and bottom support plate 53 with release layer 54 are removed (FIG. 12C). The unreacted monomers are washed away with a suitable solvent such as acetone, methanol, or isopropanol leaving a pattern of photopolymerized regions 58 on the substrate 24. Photopolymerized regions 58 correspond to the tapered optical waveguides 28 of the present invention.

In order that the optical waveguides 28 have the proper tapered shape, the optical absorption of the unreacted monomer layer 52 at the wavelengths of the UV light must be high enough such that a gradient of UV light intensity is established through the film during UV light exposure. That is, the amount of UV light available in the monomer layer to cause the initiation of the photoreaction will decrease from the top, or the image mask side, towards the bottom, or the bottom support plate side, due to the finite absorption of the monomer layer. This gradient of UV light causes a gradient in the amount of photopolymerization reaction that occurs from top to bottom, and this results in the unique tapered geometry of the developed waveguide structures, a geometry which is easily accessible with the method of the present invention. The gradient in the amount of photopolymerization which occurs from the top to the bottom of the film may be further influenced by the presence of dissolved oxygen gas in the monomer layer 52, such oxygen acting to curtail or quench the photopolymerization reaction except in those areas where all oxygen has been consumed by the free radicals produced in the photopolymerization process. Such action of dissolved oxygen gas on the progress of photopolymerization reactions is well known to those skilled in the art. Further, the requisite geometry of the photopolymer structures may be further influenced by the process of self-focussing. That is, the light falling on the surface of the monomer layer initiates photopolymerization at that surface, and since the refractive index of the solidified polymer material is higher than that of the liquid monomer, it acts to refract the light passing through it. In this manner the aerial image of light falling on the monomer nearer to the bottom of the monomer layer is altered through refraction caused by the already-polymerized material which lies above it. This effect may cause a narrowing of the resultant polymerized structure from the top surface, upon which the imaging light was directed, towards the bottom, or support plate side of the layer.

Figure 13:
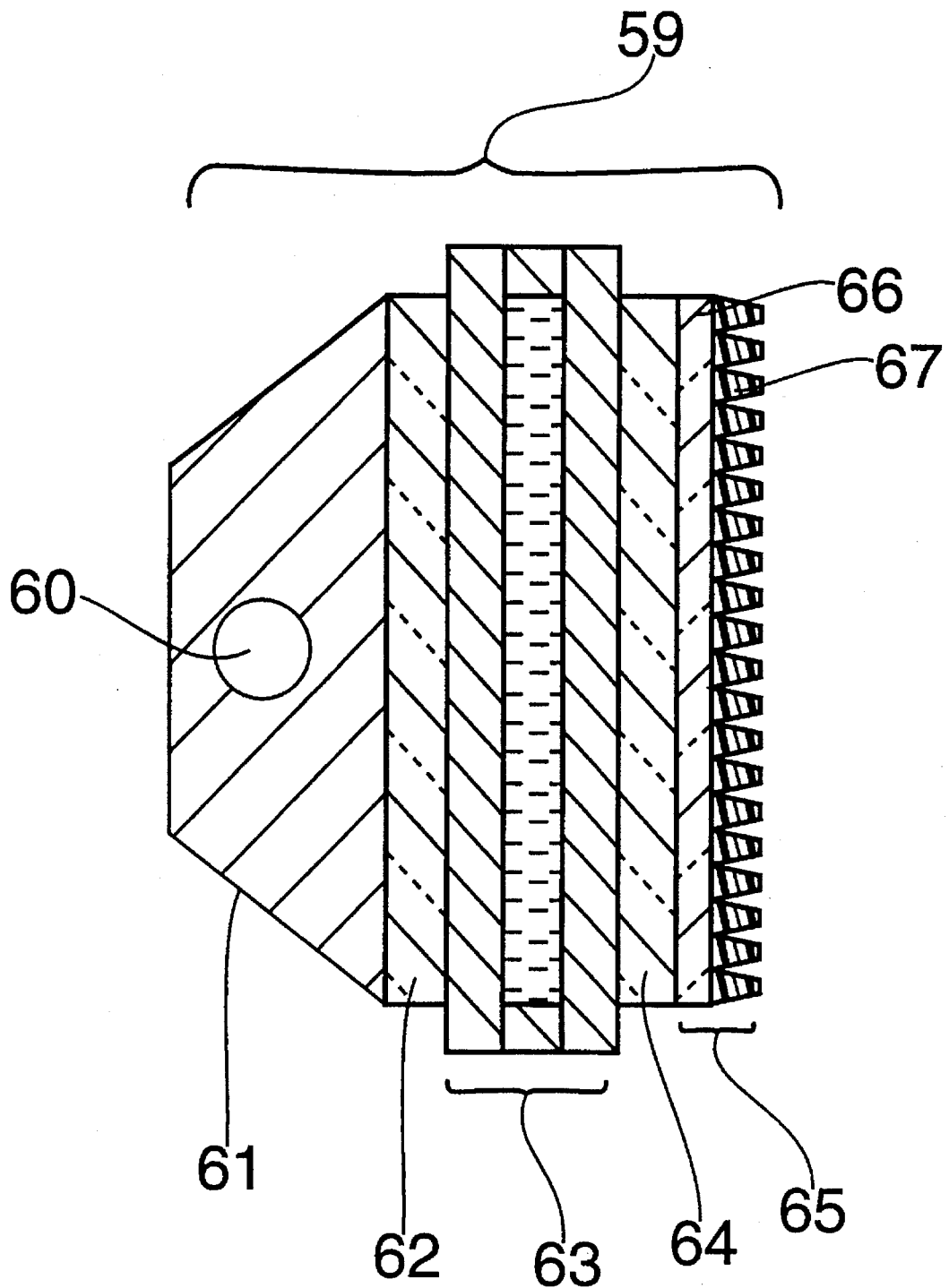
FIG. 13 is a cross-sectional view of another embodiment of a liquid crystal display constructed in accordance with the present invention.

Another embodiment of the direct view image display device of the present invention is shown in FIG. 13. Identified by the numeral 59, the display is composed of light source 60, reflecting and/or diffusing element 61, input light polarizer 62, liquid crystal cell 63, output light polarizer 64 and image display means 65 positioned in contact with the output surface of polarizer 64. Image display means 65 is composed of adhesion promoting layer 66 and individual tapered waveguides 67, and is formed directly on the surface of output polarizer 64 which serves as the substrate for image display means 65.

Figure 14:
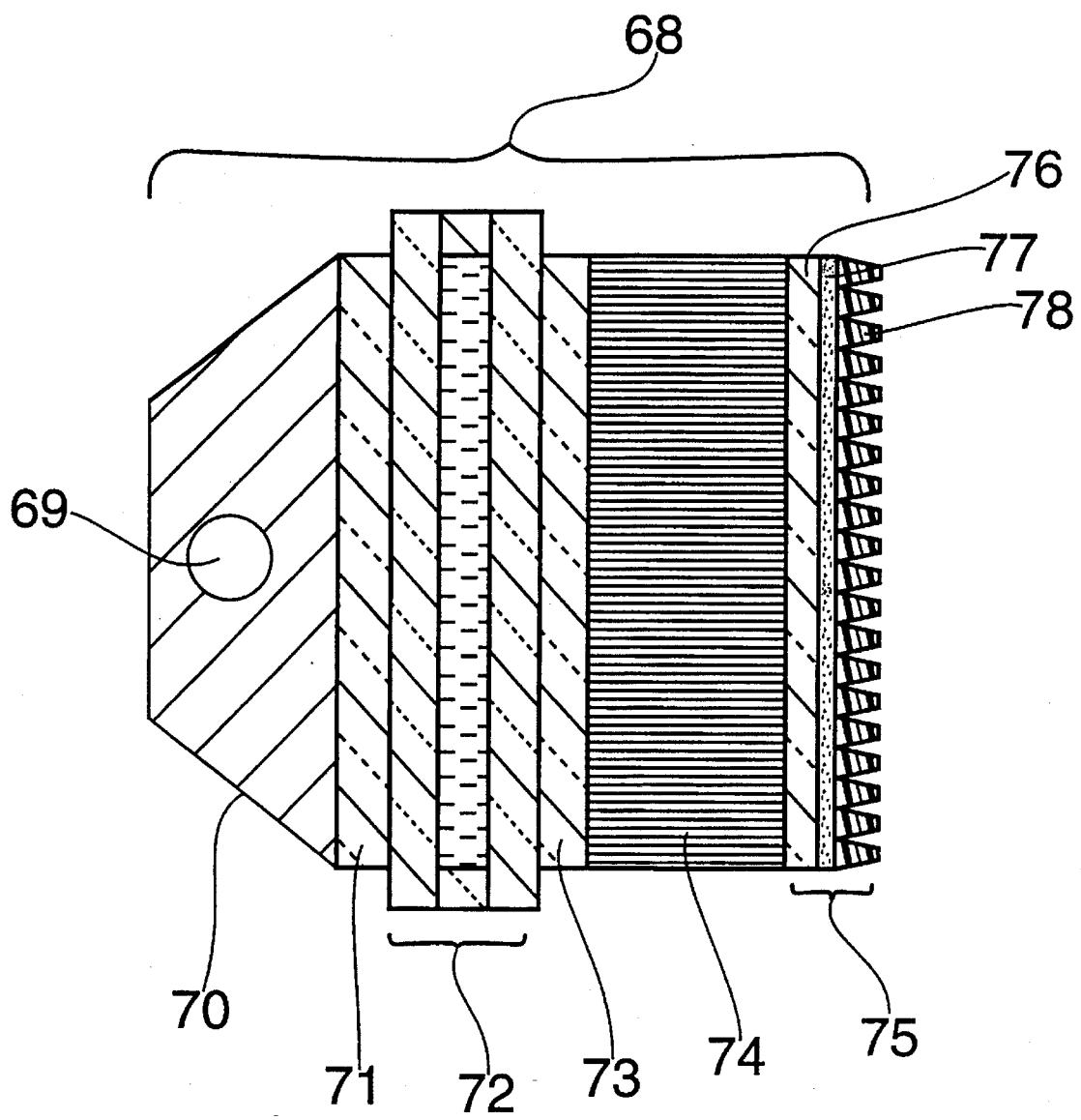
FIG. 14 is a cross-sectional view of another embodiment of a liquid crystal display constructed in accordance with the present invention.

Another embodiment of the direct view image display device of the present invention is illustrated in FIG. 14, identified by number 68. The display is composed of a light source 69, reflecting and/or diffusing element 70, input light polarizer 71, liquid crystal cell 72, output light polarizer 73, fiber-optic faceplate 74 and image display means 75 positioned in contact with the output surface of the fiber-optic faceplate 74. Image display means 75 is composed of substrate 76, adhesion promoting layer 77 and individual tapered waveguides 78. Fiber-optic faceplate 74 serves to transfer the image formed by the liquid crystal cell 72 to a image position away from the cell. Image display means 75 can improve the viewing angle of image display 68.

Figure 15:
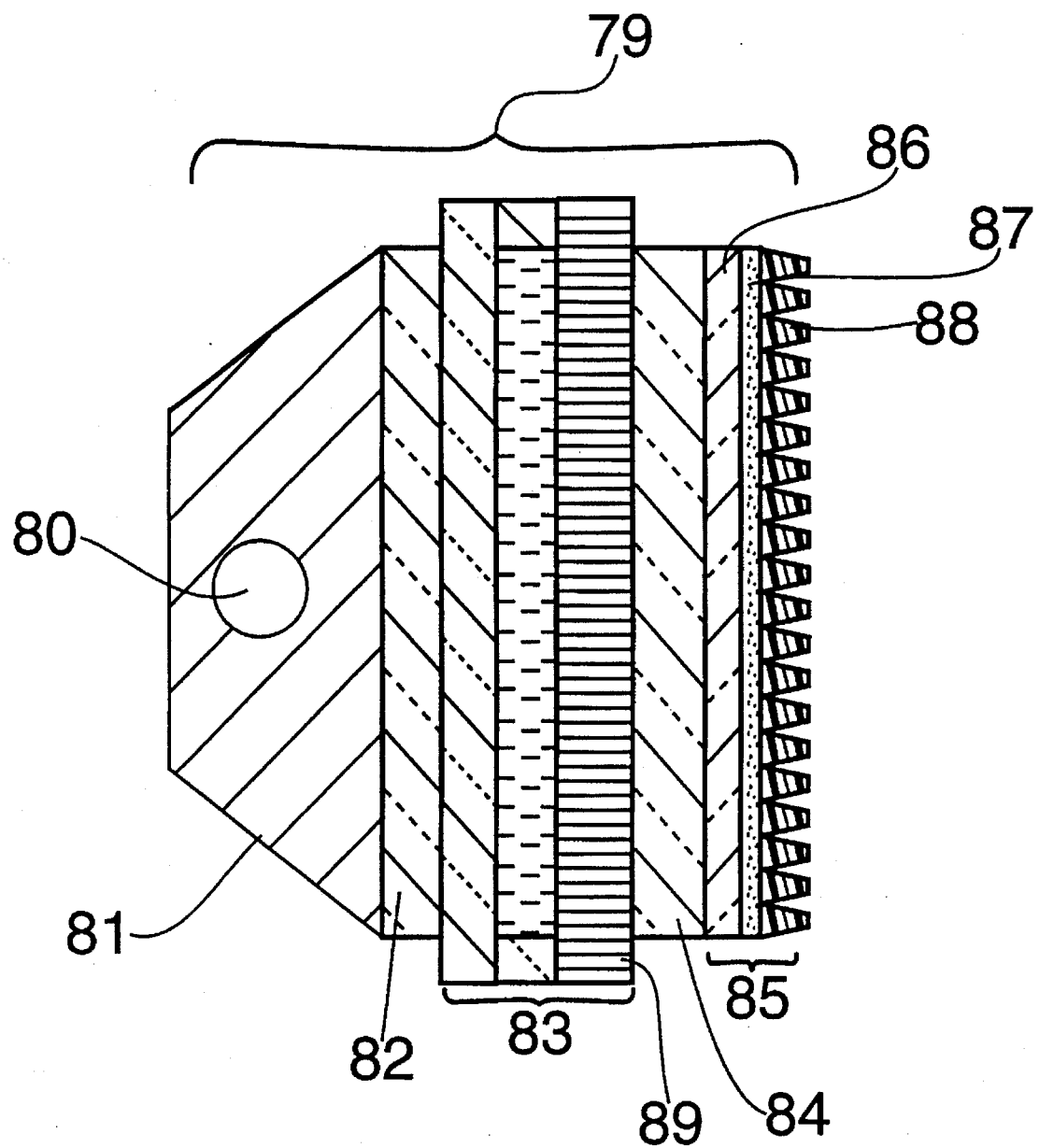
FIG. 15 is a cross-sectional view of another embodiment of a liquid crystal display constructed in accordance with the present invention.

Another embodiment of the direct view image display device of the present invention is shown in FIG. 15 and is identified by numeral 79. Display 79 is composed of light source 80, reflecting and/or diffusing element 81, input light polarizer 82, liquid crystal cell 83, output light polarizer 84 and image display means 85 positioned in contact with the output surface of the output polarizer 84. The output window of modulating means 83 is a fiber-optic face plate 89. Fiber-optic face plate 89 accepts light only from a narrow range of angles. Image display means 85 is composed of substrate 86, adhesion promoting layer 87 and individual tapered waveguides 88. Image display means 85 improves the viewing angle and chromaticity of the display 79.

Figure 16:
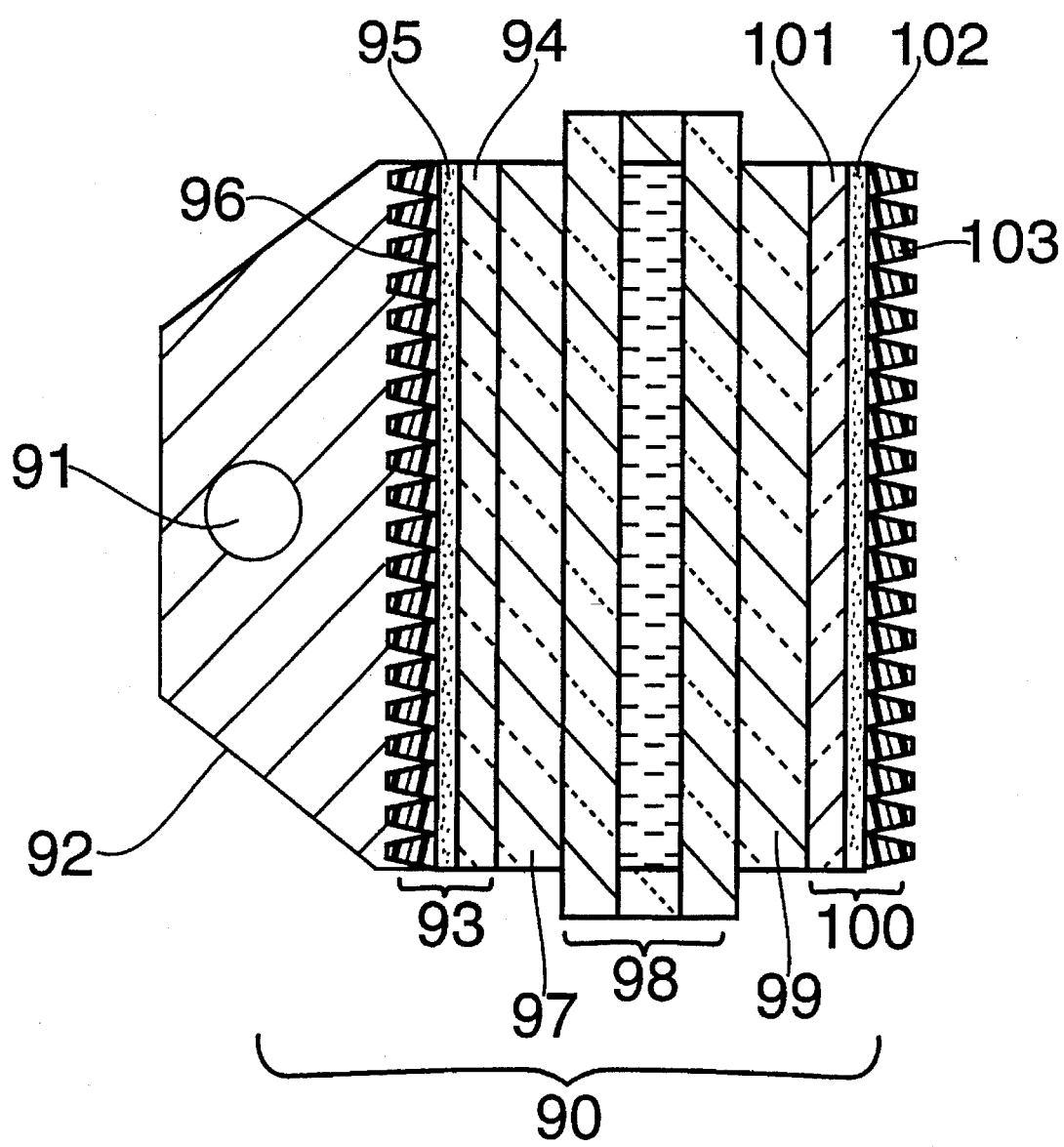
FIG. 16 is a cross-sectional view of another embodiment of a liquid crystal display constructed in accordance with the present invention.

Another embodiment of the direct view image display device of the present invention is shown in FIG. 16 and is identified by numeral 90. Display 90 is composed of a light source 91, reflecting and/or diffusing element 92, collimating means 93, input light polarizer 97, liquid crystal cell 98, output light polarizer 99 and image display means 100 positioned in contact with the output surface of the output polarizer 99. The collimating array of tapered optical waveguides 93 is composed of substrate 94, adhesion promoting layer 95 and individual tapered optical waveguides 96. The input area of each tapered optical waveguide 96 faces the light source 91 and is smaller than the output area of waveguide 96 which is positioned adjacent to adhesion promoting layer 95. The collimating means 93 improves the collimation of light entering the liquid crystal cell 98. Image display means 100 is composed of a substrate 101, an adhesion promoting layer 102 and individual tapered waveguides 103. Image display means 100 improves the viewing angle and chromaticity of the display.

Figure 17:
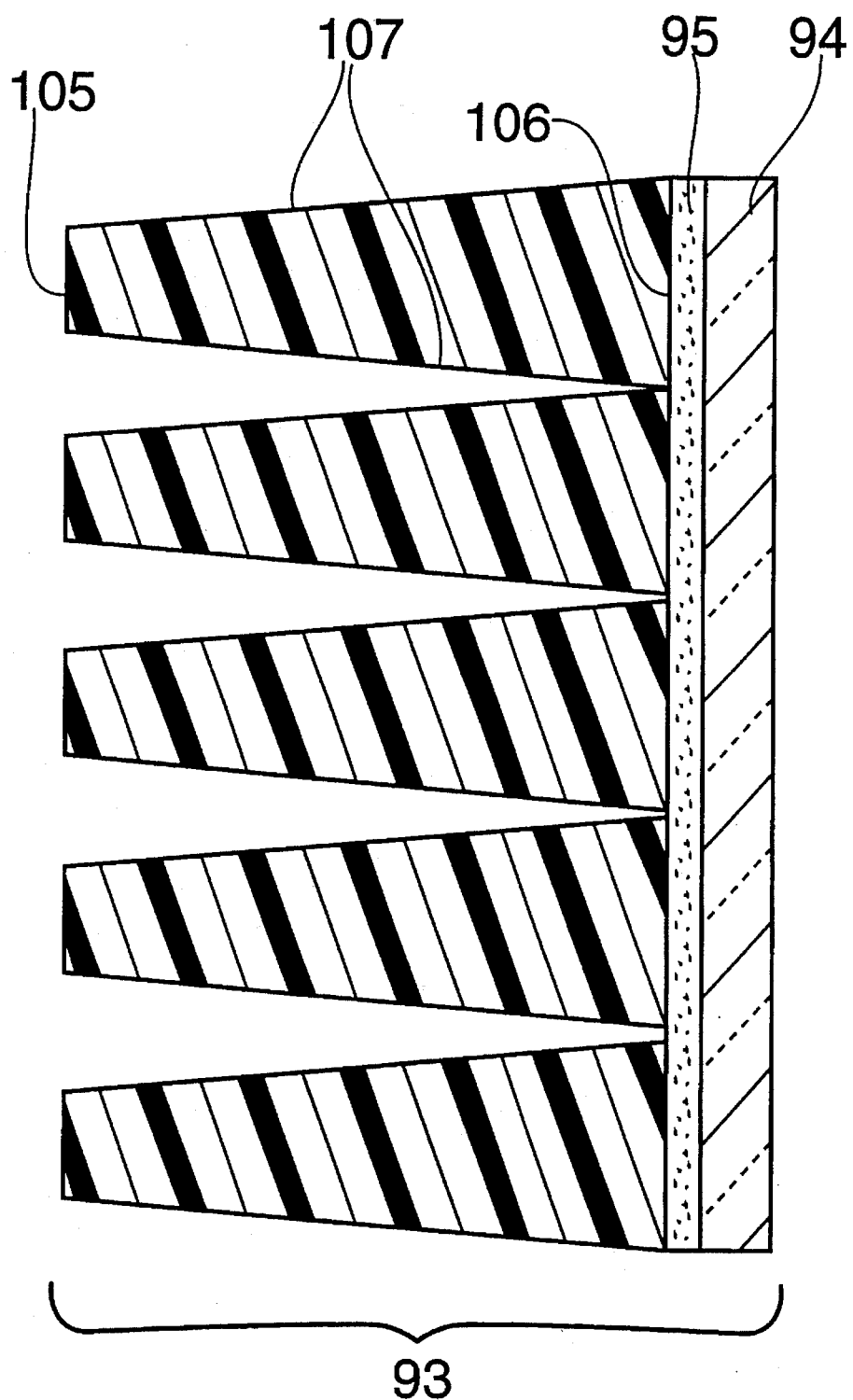
FIG. 17 shows a preferred embodiment of a collimating array of tapered waveguides.

A preferred embodiment of collimating means 93 of the present invention, is illustrated in an exploded view in FIG. 17. The collimating means 93 is composed of substrate 94, adhesion promoting layer 95 and individual tapered waveguides 96. The orientation of collimating means 93 with respect to the direction of transmitted light is opposite to the orientation of image display means 100. Waveguides 96 of collimating means 93 have input surface 105 which is smaller in area than output surface 106. Although the waveguides are illustrated with straight sidewalls 107, it is also possible for the sidewalls to be curved. Uncollimated light which enters input surfaces 105 or enters the waveguide through the sidewalls 107 will emerge from the array partially collimated. The improved collimation will improve the overall contrast of the liquid crystal display.

The direct-view display device of this invention can be used for those applications for which conventional display devices are used. Illustrative of such applications are computer terminals, televisions, airplane cockpit displays, automotive instrument panels and other devices that provide text, graphics or video information.

The following specific examples are presented to particularly illustrate the invention and should not be construed to place limitations thereon.

EXAMPLE I

The production of an array of tapered waveguides on a thin, plastic film was achieved and was most desirable because of both its thinness and economics. A photolithographically created mask (5"×5"×0.09") with a two-dimensional grid of 45 micron wide clear squares on 50 micron centers was used. The 5 micron wide spaces between squares were opaque to ultraviolet and visible radiation. Onto this mask a few drops of methanol were applied and then a 100 micron thick poly(ethylene terephthalate) (PET) film was pressed on. This PET film was prepared with an ultra-thin film surface treatment which renders it reactive and adherable to polymerizing monomer solution. Such surface-activated films were known to those skilled in the art. The surface tension of the methanol caused the film to mildly, but firmly adhere to the mask. The mask and the surface-activated PET film constituted the array substrate subassembly. Onto a separate 5"×5"×0.25" blank glass plate was bonded a PET film using a pressure sensitive adhesive. This constituted the release film subassembly. The release film subassembly was placed film-side up on a black, metal platform containing threaded holes. Metal spacers, 1 cm×3 cm×200 microns thick, were placed around the edges on top of the release film. Approximately 1 milliliter of a photopolymerizable monomer solution was delivered to the center of the release film. This monomer solution consisted of 62 parts ethoxylated bisphenol A diacrylate, 31 parts trimethylolpropane triacrylate, 1 part Irganox 1010 antioxidant, 2 parts Darocure 1173 photoinitiator, 2 parts Irgacure 651 photoinitiator, and 2 parts Irgacure 500 photoinitiator. The array substrate subassembly was then placed, film-side down on top of the monomer solution. A clear glass 5"×5"×0.25" plate was placed on top of this entire fabrication assembly and metal clamps and screws were used to fully and evenly compress the plates together resulting in a 200 micron thick monomer solution layer between the release film and the array substrate.

At this point the entire fabrication assembly was placed under the collimating lens of a ultraviolet/visible (UV-vis) radiation exposure system. The UV-vis system contained a 1000 Watt Mercury-Xenon lamp and delivered even, collimated, and homogeneous full-spectrum radiation with an intensity of 85 mW/cm$^2$ to the entire 5"×5" area of the fabrication assembly. The sample was irradiated for 0.76 seconds. The fabrication assembly was then dissassembled and the array film with the tapered optical waveguides now formed, but still covered with monomer solution in the interstitial regions between elements, was placed upside-down in a bath of isopropanol and left for ten minutes. Isopropanol was a relatively poor solvent for the monomer but was advantageous since it allowed for the even and mild development of the optical waveguide elements' reflective walls. After removal of the the residual monomer, the tapered optical waveguides were dried in a stream of nitrogen gas, placed in a a nitrogen gas-purged enclosure, and hard cured under the UV-vis radiation for an additional 20 seconds.

Electron microscopy and optical microscopy were used to evaluate the tapered optical waveguides. The individual optical waveguides were observed to have the shape of truncated right square pyramids. The elements were 200 microns tall. The width of the smaller, output surface of the optical waveguides was 20 microns. The reflective sidewalls were very smooth and joined together at a depth of 160 microns below the output surface face. The input surface of the waveguides was located at the interface between the 100 micron thick PET array substrate and the width of this input surface was 50 microns although, as described, the input surfaces were totally fused together in this example. The taper angle of the optical waveguides was thus 12 degrees.

EXAMPLE II

Example 1 above was taken as a starting point. The tapered optical waveguides were abundantly covered with carbon lampblack powder, an optically absorbing material. The lampblack powder had a average particle size much smaller than the 50 micron dimensions of the optical waveguides. The powder was then carefully smoothed into the interstitial regions of the array of tapered optical waveguides using a soft instrument, in this case a gloved finger. The excess was removed with the same instrument. The optical waveguides were so robust that the lampblack could be spread without causing visible damage. Looking at the output side of the tapered waveguide array, the lampblack caused the array to appear a dark, matte black. The percent of the visible surface area which was blackened was determined to be 85 percent.

A transmission measurement was carried out by passing a helium-neon laser beam with a gaussian mode shape and a 6 degree full divergence angle through the array of tapered optical waveguides. When the light propagated from the light input side towards the light output side of the waveguides, the transmission was 60%.

A further experiment was carried out on a seperate array of tapered optical waveguides. Here half the array was filled with lampblack powder and the other half was filled with a black liquid epoxy. After the epoxy dried the two samples were compared. The array area filled with lampblack when viewed from the light input side to the light output side appeared very transmissive and showed a transmission of 60 percent. The array area filled with black epoxy when viewed from the light input side to the light output side appeared much less transmissive and showed a transmission of about 15 percent. This showed that the choice of optically absorbing material was very critical in allowing light to propogate successfully through the array of tapered waveguides. Where the optically absorbing material was lampblack powder, the powder came in direct contact with only a small fraction of the surface area of the waveguide sidewalls and allowed the phenomenon of total internal reflection to proceed unimpeded. Light was transmitted through the waveguides by entering the input ends of the waveguides, reflecting off the side walls of the waveguides and exiting through the output surfaces. When the optically absorbing material was a black epoxy, it index matched to the reflective sidewalls and caused the light to couple through the sidewalls and be absorbed by the optically absorbing material.

EXAMPLE III

Example 2 above was taken as a starting point. The array of tapered optical waveguides with interstitial regions filled with lampblack powder was laminated together with a piece of PET film prepared with a pressure sensitive adhesive. The pressure-sensitive adhesive formed an index matched interface with the output surface of the optical waveguides. The array of waveguides continued to show a transmission of 60 percent as in example 2 above. The array of tapered optical waveguides was now fitted with a protective layer and was washed, flexed, and handled without damage to the waveguides and without loss of the powdery, optically absorptive material.

EXAMPLE IV

Example 2 above was taken as a starting point. The array of tapered optical waveguides with interstitial regions filled with lampblack powder was laminated together with a piece of plastic heat-activated lamination film, typically used to laminate identification cards. The laminating film formed an index matched interface with the output surface of the optical waveguides. The array of waveguides continued to show a transmission of 60 percent as in example 2 above. The array of tapered optical waveguides was now fitted with a protective layer and was washed, flexed, and handled without damage to the waveguides and without loss of the powdery, optically absorptive material.

EXAMPLE V

Example 4 above was taken as a starting point. When viewed from the light output surface, the laminated, protective film offered a continuous air-plastic interface which caused light from behind the viewer to be reflected back into the viewer's eye. The example was covered with a layer of the same photopolymerizable monomer solution as used in example 1 above. On top of the array and monomer solution was then placed a glass plate with an anti-reflection coating. After curing the monomer solution with UV-vis radiation, the array of tapered optical waveguides with a protective, laminated plastic film, and a further anti-reflection coated glass plate was observed to appear much darker. This was due to the reduction in reflected spurious light reaching the viewer's eyes.

EXAMPLE VI

Example 4 above was taken as a starting point. The protected array of tapered optical waveguides with absorptive black material was placed in front of a helium-neon laser beam with a gaussian mode shape and a 6 degree full divergence angle. The laser beam propagated from the light input side to the light output side. The light output was then observed on a diffusive viewing screen to be transformed into a broad pattern. This pattern was analyzed using video frame grabbing instrumentation and computer software. Analysis showed that this array of tapered optical waveguides caused light to be transformed into a broad output pattern centered about the central laser beam spot. Due to the use of a single laser beam and the geometry of the waveguides, the output pattern contained four-fold symmetry and 8 spots of roughly equal intensity. The full angular distribution of the regions of maximum spot intensity was 40 degrees. The entire output pattern of the array of tapered waveguides showed a relatively smoothly decreasing variation in light output intensity over a full angle of about 60 degrees even though the laser beam input had only a 6 degree divergence.

A lambertian diffuser offered an object to test the absolute display characteristics of the array of tapered optical waveguides. The intensity of the light propagating collinearly with the laser beam was normalized to 1. At a full angle of 40 degrees, the array of tapered optical waveguides provided 50 percent of the intensity of the ideal lambertian diffuser. At a full angle of 60 degrees, the array of tapered optical waveguides provided 17 percent of the intensity of the ideal lambertian diffuser. It should be pointed out that the lambertian diffuser operates by a mechanism of intense scattering and transmitted only 47 percent of the light incident on one surface in the forward direction.

What is claimed is:

1. A direct view flat panel display comprising:
   (a) a light generating means for generating light;
   (b) a modulating means for modulating light from said light generating means to form an image; and
   (c) an image display means for displaying said image from said modulating means positioned adjacent to the light output surface of said modulating means, said display means comprising an array of tapered optical waveguides on a planar substrate the tapered end of each of said waveguides extending outward from said substrate and having a light input surface adjacent said substrate and a light output surface distal from said light input surface, wherein:
      (i) the area of the light input surface of each waveguide is greater than the area of its light output surface, and the center-to-center distance between the light input surfaces of adjacent waveguides in said array is equal to the center-to-center distance between the light output surfaces thereof, so that the angular distribution of light emerging from the output surfaces of the waveguides is larger than the angular distribution of light entering the waveguides; and
      (ii) the waveguides in said array are separated by interstitial regions with a lower refractive index than the refractive index of said waveguides.

2. The device of claim 1 wherein said waveguides are striated.

3. The device of claim 1 wherein said waveguides contain scattering centers.

4. The device of claim 1 which further comprises a fiber-optic face plate.

5. The direct view flat panel display of claim 1 wherein said angular distribution of light entering said waveguides ranges from about −6 to about +6 degrees.

6. The direct view flat panel display of claim 1 wherein said angular distribution of light entering said waveguides ranges from about −10 to about +10 degrees.

7. The direct view flat panel display of claim 1 wherein said angular distribution of light emerging from the output surfaces of the waveguides ranges from about −30 to about +30 degrees.

8. The direct view flat panel display of claim 1 wherein said angular distribution of light emerging from the output surfaces of the waveguides ranges from about −60 to about +60 degrees.

9. The direct view flat panel display of claim 1 wherein said angular distribution of light emerging from the output surfaces of the waveguides ranges from about −80 to about +80 degrees.

10. The device of claim 1 wherein said modulating means is a liquid crystal modulator.

11. The device of claim 10 which futher comprises:
   (d) an input light polarizing means positioned between said light generating means and said modulating means for polarizing light generated by said light generating means; and
   (e) an output light polarizing means positioned between said modulating means and said image display means for polarizing light emitted from said modulating 12. The device of claim 1, 10 or 11 wherein all or a portion of said interstitial regions are opticially absorptive.

13. The device of claim 12 wherein all or a portion of said interstitial regions contain an optically absorptive material.

14. The device of claim 13 wherein all or a portion of said material is in particulate form.

15. The device of claim 14 wherein said material is carbon black.

16. The device of claim 1, 10 or 11 wherein the tapered optical waveguides are constructed from organic polymeric material.

17. The device of claim 1, 10 or 11 wherein the shape of said waveguides is selected from the group consisting of right circular cones, right oval cones, right square pyramids, and right rectangular pyramids, which may be whole or truncated, 18. The device of claim 17 wherein the shape of said waveguides is a truncated right circular cone.

19. The device of claim 17 wherein the shape of said waveguides is a truncated right square pyramid.

20. The device of claim 1, 10 or 11 wherein the tapered optical waveguides possess a light input surface with largest dimension less than 100 microns across and a height of at least 200 microns with the ratio of input area to output area of at least 2.1.

21. The device of claim 1, 10 or 11 wherein said device further comprises a protective layer bonded to said waveguide array, said protective layer being positioned to receive output from the light output surfaces of the waveguides in said array.

22. The device of claim 21 wherein said protective layer has an anti-reflective coating.

23. The device of claim 11 wherein said device further comprises a protective layer bonded to said waveguide array, said protective layer being positioned to receive output from the light output surfaces of the waveguides in said array and said protective layer containing an array of negative lenses.

24. The device of claim 11 which further comprises a light-collimating means for collimating light from said generating means positioned adjacent to the light input surface of the input polarizer of said modulating means, said light-collimating means comprising an array of tapered optical waveguides on a planar substrate, the tapered end of each waveguide extending outward from said substrate and having a light output surface adjacent said substrate and a light input surface distal said light output surface, wherein:
   (i) the area of the light input surface of each waveguide is smaller than the area of its light output surface, and the center-to-center distance between the light input surfaces of adjacent waveguides in said array is equal to the center-to-center distance between the light output surfaces thereof, so that the divergent light from an uncollimated illumination system is partially collimated upon emergence from their output surfaces; and
   (ii) the waveguides in said array are separated by interstitial regions with a lower refractive index than the refractive index of said waveguides.

25. A direct view flat panel display comprising:
   (a) a light generating means for generating light;
   (b) a modulating means for modulating light from said light generating means to form an image wherein said modulating means has pixels; and
   (c) an image display means for displaying said image from said modulating means positioned adjacent to the light output surface of said modulating means, said display means comprising an array of tapered optical waveguides on a planar substrate the tapered end of each of said waveguides extending outward from said substrate and having a light input surface adjacent said substrate and a light output surface distal from said light input surface, wherein:
   (i) the area of the light input surface of each waveguide is greater than the area of its light output surface, and the center-to-center distance between the light input surfaces of adjacent waveguides in said array is equal to the center-to-center distance between the light output surfaces thereof, so that the angular distribution of light emerging from the output surfaces of the waveguides is larger than the angular distribution of light entering the waveguides;
   (ii) the waveguides in said array are separated by interstitial regions with a lower refractive index than the refractive index of said waveguides; and
   (iii) said center-to-center distance between said light input surfaces of adjacent tapered optical waveguides is less than the center-to-center distance between adjacent pixels of said modulating means.

26. The direct view flat panel display of claim 25 wherein the ratio of said center-to-center distance between said light input surfaces of adjacent tapered optical waveguides to said center-to-center distance between said adjacent pixels of said modulating means is from about 0.025 to less than 1.

27. The direct view flat panel display of claim 25 wherein the ratio of said center-to-center distance between said light input surfaces of adjacent tapered optical waveguides to said center-to-center distance between said adjacent pixels of said modulating means is from about 0.125 to about 0.50.

28. The direct view flat panel display of claim 25 wherein the ratio of the length of each of said tapered optical waveguides to said center-to-center distance between said light input surfaces of adjacent tapered optical waveguides is from about 0.25 to about 20.

29. The direct view flat panel display of claim 25 wherein the ratio of the length of each of said tapered optical waveguides to said center-to-center distance between said light input surfaces of adjacent tapered optical waveguides is from about 1 to about 8.

30. The direct view flat panel display of claim 25 wherein said center-to-center distance between said light input surfaces of adjacent tapered optical waveguides is from about 5 to less than 200 microns.

31. The direct view flat panel display of claim 25 wherein said center-to-center distance between said light input surfaces of adjacent tapered optical waveguides is from about 15 to less than 200 microns.

32. The direct view flat panel display of claim 25 wherein said center-to-center distance between said light input surfaces of adjacent tapered optical waveguides is from about 25 to about 100 microns.

33. The direct view flat panel display of claim 25 wherein the length of each of said tapered optical waveguides is up to 4,000 microns.

34. The direct view flat panel display of claim 25 wherein the length of each of said tapered optical waveguides is from about 5 to about 1,600 microns.

35. The direct view flat panel display of claim 25 wherein the length of each of said tapered optical waveguides is from about 10 to about 800 microns.

36. The direct view flat panel display of claim 25 wherein said light output surface area of each of said tapered optical waveguides is from about 1 to about 50 percent of the light input surface area of each of said tapered optical waveguides.

37. The direct view flat panel display of claim 25 wherein said light output surface area of each of said tapered optical waveguides is from about 3 to about 25 percent of the light input surface area of each of said tapered optical waveguides.

* * * * *